United States Patent [19]

Ballance

[11] Patent Number: 5,063,595
[45] Date of Patent: Nov. 5, 1991

[54] OPTICAL COMMUNICATIONS NETWORK

[75] Inventor: John W. Ballance, Woodbridge, England

[73] Assignee: British Telecommunications Public Limited Company, Great Britain

[21] Appl. No.: 488,046

[22] PCT Filed: Nov. 28, 1988

[86] PCT No.: PCT/GB88/01050
§ 371 Date: May 21, 1990
§ 102(e) Date: May 21, 1990

[87] PCT Pub. No.: WO89/05078
PCT Pub. Date: Jun. 1, 1989

[30] Foreign Application Priority Data

Nov. 27, 1987 [GB] United Kingdom ............... 8727846

[51] Int. Cl.$^5$ .................... H04L 9/02; H04K 1/00
[52] U.S. Cl. ................................... 380/48; 380/2;
380/9; 359/137; 359/173; 359/152
[58] Field of Search .............. 380/2, 48, 9; 455/612;
350/96.1

[56] References Cited

U.S. PATENT DOCUMENTS 3,920,894 11/1975 Shirley et al. .
3,931,472 1/1976 Gill et al. .
4,817,144 3/1989 Citta et al. ..................... 380/20

FOREIGN PATENT DOCUMENTS 0232043 12/1989 European Pat. Off. .

OTHER PUBLICATIONS

Electronics Leters, vol. 23, No. 24, Nov. 19, '87, pp. 1255-1257.

Primary Examiner—Stephen C. Buczinski
Attorney, Agent, or Firm—Nixon & Vanderhye

[57] ABSTRACT

A passive, all optical communications network is provided in which a single optical source in a central station serves many outstations (e.g., telephones in customers' premises). Time division multiplexed optical signals from a laser source are transmitted along a single optical fibre (14) from a central station (4). The signal is split between several secondary fibres at a first splitter (10) (e.g., an array of passive couplers) and between further sets of fibres at a second set of splitters (12). At this stage there are 120 individual fibres to customers' premises (8). Digital speech or data is sent back to the central station by a laser in the customers' premises operating in a low duty-cycle mode. The 120 data streams are interleaved at the branching points.

4 Claims, 16 Drawing Sheets

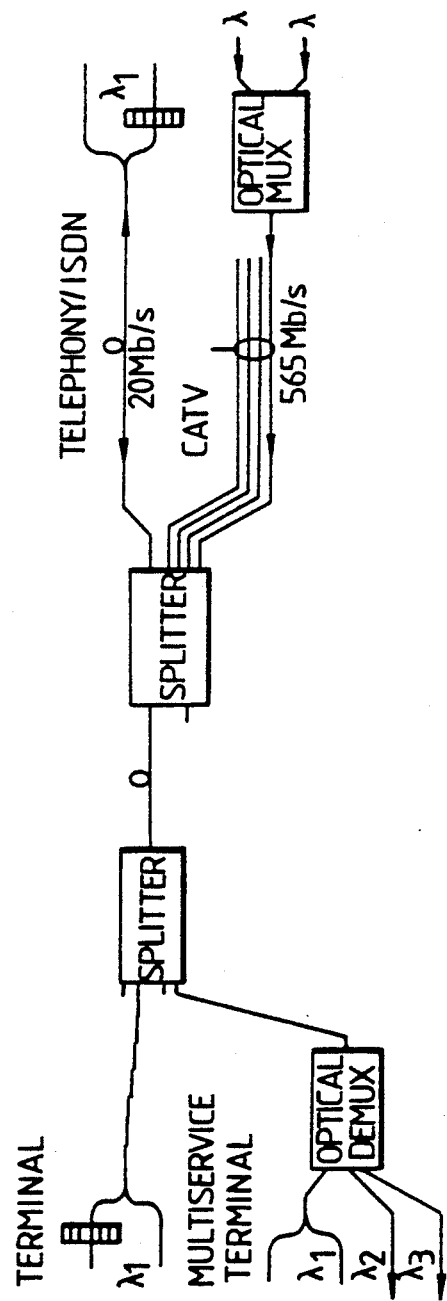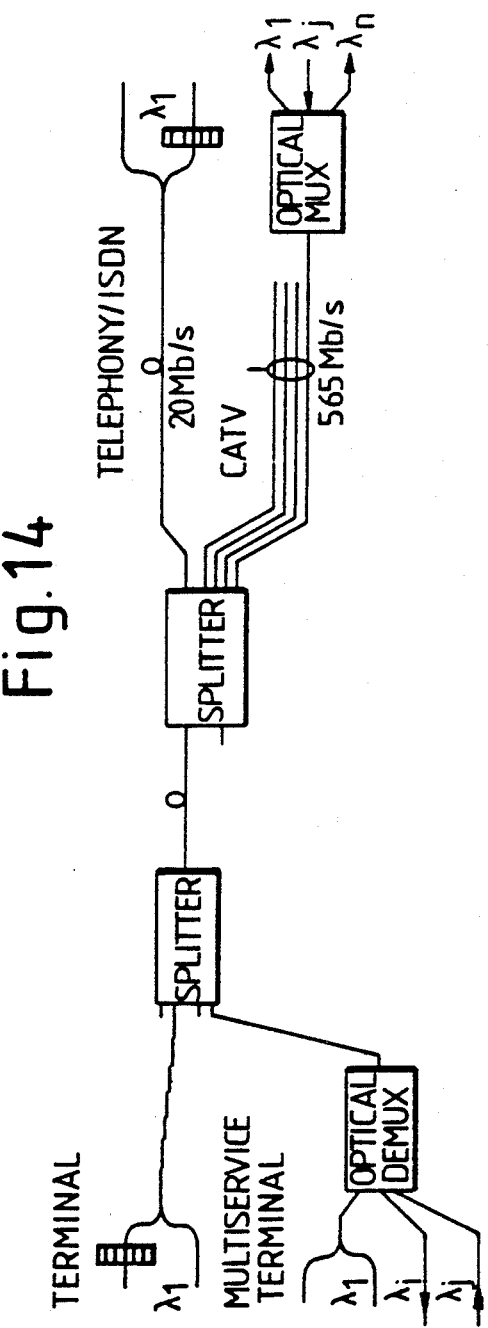

Fig.15
BASIC FRAME

| 2304 BIT FOR TRAFFIC | 128 SINGLE BIT HOUSEKEEPING CHANNELS & 12 BITS FOR FIBRE ID |

121.95μs = 1 BF = 2444 BITS

Fig.16
MULTI-FRAME

| 50 | 52 |
| 80 BASIC FRAMES (BF) FOR DATA & HOUSEKEEPING | 2 BF FORM A SYNC FRAME (SF) |

10ms = ONE MULTI-FRAME (MF) = 82 BF = 200 408 BITS

Fig.17
SYNC FRAME FROM HEAD END

| 52B | 52A |
| 4748 BITS FOR FIBRE ID AND SYSTEM MAINTENANCE INFORMATION | 140 BITS FOR MF SYNC PATTERN |

EXCHANGE TO CUSTOMER DIRECTION: 243.9μs = 2BF = 1 SF

Fig.18
SYNC FRAME FROM CUSTOMER END

| 54A | 54B |
| 4288 BIT PERIODS = 213.96μs FOR PHASE 1 RANGING | 660 BITS FOR PHASE 2 RANGING & FIBRE ID |

CUSTOMER TO EXCHANGE DIRECTION: 243.9μs = 2BF = 1 SF

Fig.19
RANGING FROM CUSTOMER END

| 54D | 54C |
| 1 ID SYNC PULSE FOLLOWED BY 19 ZERO BITS | 640 BITS FOR 128 FIVE BIT PHASE 2 RANGING SUBSLOTS |

660 BITS FOR PHASE 2 RANGING & FIBRE ID

OPTICAL COMMUNICATIONS NETWORK

This invention relates to optical fibre communications networks and in particular, but not exclusively, to the provision of networks serving single line telephony out stations.

BACKGROUND OF THE INVENTION

One approach to the deployment of an optical fibre communications network is the so called FAS network as described in the paper entitled "Future evolution of British Telecom's private circuit and circuit switched services" by Dr. S. O'Hara, IEE Colloquium February 1986 which is aimed at the telephony and data needs of large business customers with ten or more lines. A principal drawback of the FAS type architecture is that it relies on direct, dedicated point-to-point optical links from each customer to the local exchange. This means that small to medium business customers with typically only two to five lines cannot be economically connected to a FAS type network. For residential customers with a requirement for single line telephony the cost requirements are still more severe and it appears from present estimates that it is unlikely that a direct optical connection per customer from the exchange will ever be a commercial possiblity.

One proposal for extending the use of optics beyond large business customers, is to provide new broadband services in addition to the telephony service, such as cable television for example, as described in "The British Telecom switched star network for CATV" by W. K. Ritchie, BT Technology Journal, September 1984.

In such an approach the strategic aim is to seek to move towards an integrated multiservice network, conveying both narrowband services (telephony+data) as well as broadband (entertainment TV, video library service etc) so that the relatively high cost of extending an optical connection to the residential customer can be justified by the combined revenue of both types of service. The major difficulty with this approach, however is that there is not yet an adequate customer demand for such services to justify the very substantial investment that would be required. The view is nevertheless widely held both in the UK and abroad that the eventual development of integrated multiservice networks is inevitable and will most likely occur at some stage during the 1990's. While such circumstances continue to prevail, any further extension of optical technology into the Local Loop must be largely justified on the basis of providing cost effective solutions for the provision of the basic telephony/data services.

One possible approach is a partial optical solution in which the optical network extends only as far as the street distribution point (DP), with the known copper wire link being used for the final feed to the telephony/data customers.

There are several disadvantages with this approach. It requires the use of remotely stationed electronics in the field in concentrating traffic economically onto highly multiplexed feeders back to the exchange. Active electronics is in general required both at the street Cabinet level and the DP. The latter is also street located except for business customers large enough to justify their own DP. For such a system there are potential problems related to the maintenance, reliability, power feeding and power consumption of the remote electronic nodes.

SUMMARY OF THE INVENTION

It is an object of the present invention to provide a digital communications network which has the potential to reduce the likelihood of unauthorised users receiving the downstream broadcast transmission. Accordingly there is provided a central station for a digital communications network, arranged to transmit data to outstations in the form of a stream of frames, each frame comprising a first portion containing a synchronisation signal and housekeeping data for the outstations, and a second portion containing traffic data for the outstations, characterised in that the central station comprises scrambling means arranged to scramble the contents of said first portions in accordance with a first predetermined binary sequence, and arranged to scramble the contents of said second portions in accordance with a second predetermined binary sequence.

An unauthorised user may by trial and error try to descramble the downstream broadcast transmission, but unless he uses sophisticated equipment he will only be able to find the scrambling sequence of one or other of the portions of the frames.

There is also provided an outstation for a digital network, arranged to receive frames from a central station as defined above, characterised in that the outstation comprises descrambling means for descrambling the contents of said first portions in accordance with said first predetermined binary sequence, and for descrambling the contents of said second portions in accordance with said second predetermined binary sequence, and means responsive to a synchronization signal in the frames to select said second predetermined binary sequence at the start of said second portions and to select said first predetermined binary sequence at the start of said first portions.

Preferably the network provides a 128 optical split for each exchange line with a 20 Mbit/s bitrate of operation. This bitrate/split combination allows an attractive set of options for both business and residential customers. Thus at a chosen maximum split of 128 (120 customers plus 8 test ports), capacity would be available to feed each customer, if desired, with an ISDN 144 kbit/s channel or equivalent capacity. For business districts, where multiple line customers are in the majority, a lower optical split would be employed, allowing higher capacities to be delivered per customer. In the first instance networks may be planned to deliver capacities well within the 20 Mbit/s feeder capability, leaving substantial margin for uprating both in terms of providing additional numbers of 64 kbit/s lines or introducing, say, ISDN service.

In such a network it is preferable that all systems be designed to a fixed optical loss criterion appropriate to the full 128 way split, regardless of the actual degree of split initially required by the first customer set. This would give great planning flexibility, allowing additional customers to be connected to the network as demand arises. Thus all stages of the 128 way matrix would be implemented at the outset, giving the full loss specification, but with only the minimum number of couplers being installed to provide connections to the initial customers.

Although a network may be provided which is a fully passive optical network with a direct fibre feed into various business or residential customers, it can be associated with some electrical links to provide a hybrid variant in which there is an active electronic node at the DP and copper connection to the subscriber but which is compatible with, and fully uprateable to, the optical network according to the present invention. Such a system may prove most economic for the early penetration of the residential market where cost targets for telephony service alone are at their most severe.

Another important advantage of the present invention is network evolution. This architecture offers considerable opportunity for evolution towards the broadband multiservice network of the future via the addition of separate optical wavelengths carrying the new broadband services on the same passive optical network. This should be possible without disrupting, or loading the costs, of the original service provided adequate planning and provision is made at the time of the initial installation.

The component parts of the applicant's optical network can be conveniently classed under the major subject areas of I) Optical Technology and Optical System Design, II) Optical External Plant, III) Bit Transport System Design, IV) Network Interface and Overall System Design, and V) Network Management and Testing, which will now be discussed in turn.

I Optical Technology and Optical System Design a) Network Topology

Choice of topology is an important consideration in minimising the overall cost of the network. There are several topologies that could be implemented to provide a passive optical network according to the present invention. Key issues in the final choice will be: provisioning and maintenance costs, services provided, growth strategy and potential for evolution to broadband services. For each option that may be considered the initial network cost arguments also need to be carefully weighed against the potential for future evolution. Choices include full bidirectional working, partial bidirectional working, separate upstream and downstream links between the exchange and a customer, and the use of copper wire in the link between the DP and some customers in an otherwise all optical fibre network.

b) Optical Splitter Technology

The optical power splitters are conveniently fused fibre couplers. However, longer term options such as holographic devices when fully developed may provide the means for achieving potentially lower costs.

c) Customer's Laser Transmitter Module

The customer's laser is one of the most critical components affecting the customer costs. The detailed operational requirements for any device required to be low cost specifically determine the choices in package design, drive and protection electronics and laser reliability (coupled with environmental performance). For example an uncooled package is likely to be desirable for a low cost transmitter module in order to reduce power consumption, simplify the package design and assembly and reduce overall transmitter costs. The removal of the cooler, however, results in the temperature of the laser being uncontrolled with a consequent increase in the laser degradation rate at the upper end of the ambient temperature range. In addition the temperature dependence of laser/fibre coupling will become more critical. In the system high pulse powers are required to overcome the splitting losses of the network. If excessive peak optical powers are to be avoided (leading to high current densities and lower reliability) then low cost packages with good coupling efficiency will be desirable. Although the bitrate of 20 Mbit/s presently envisaged permits the use of low cost CMOS VLSI, transmitters/receivers operating at 45-50 Mbit/s could alternatively be provided. Such devices, although using costlier electronics, may in fact be cheaper overall bearing in mind that packaging costs are likely to be dominant. The latter will be influenced chiefly by the degree of factory investment/automation committed which will in turn be determined by anticipated production volume.

It will be appreciated that the foregoing relates to the costs of implementing a network as described herein present invention and that more expensive laser devices could be employed although this would be likely to result in increased costs.

The customer transmitter is preferably operated on a low duty cycle as described in the applicants co-pending UK patent application UK 8700069 filed 5th Jan. 1987. Further, it is preferable that the laser output level is controlled by remote monitoring by the exchange as described in the applicant's co-pending UK patent application 8710736 filed 6th May 1987 which allows elimination of the monitoring photodiode from the customers transmitter or frees it to be used as a detector.

d) Customer's Receiver Module

The customer's receiver will require almost the same price reductions as the transmitter module to ensure economic penetration of the network to customers with few lines but it is stressed that this cannot be obtained at the cost of poor optical performance as this would adversely affect the optical power budget and hence the overall network costs.

e) Optical Blocking Filter

An optical blocking filter is a preferred component, as it ensures that future upgrading of the network is possible without disturbing existing telephony customers. For some network topology options (e.g. full duplex) it may assist in coping with the problems of crosstalk arising from reflections. Thus, if different wavelengths are used in the upstream and downstream directions, narrow band filters can be used to discriminate against reflected light before it reaches the optical receivers.

Various technologies are or will be available with grating, interference and holographic devices offering potential for achieving low cost devices.

Initial analysis indicates that the optimum place for the filter to minimise cost and operational difficulties is within the customer's receiver. Options include interposing slivers of Dichromated Gelatin (DCG), multi-layer dielectric interference or a photopolymer filter between the receiver photodiode and the package tail fibre, or depositing multi-layer dielectric or other filter material directly onto the receiver photodiodes at the wafer stage. Other approaches for mounting the filter are considered below.

f) Exchange Optical Equipment

The exchange optical equipment, although not so cost sensitive as the customer equipment devices, has a more demanding performance specification. The laser transmitter needs to have a high mean output power and a well controlled and tightly specified centre wavelength. Preferably, single longitudinal mode source (e.g. DFB or DBR lasers) are used to ensure that only a minimum width of optical spectrum needs to be allocated to the initial telephony service, thus conserving valuable spectrum as much as possible for future service growth. The receiver is required to be sensitive and yet cope with timing jitter, due to imperfect ranging delay compensation, and unequal optical power in adjacent bits, due to unequal path attenuations and customer laser output power tolerances. Thus it is preferable that the receiver is a DC coupled design or at least has the threshold level in the decision circuitry DC coupled relative to the zero level of the optical bit stream.

II Optical External Plant a) Passive Network Design

Ideally the network is designed to be able to grow and change, both in terms of telephony customers being added and in terms of new services (wavelengths). In its most preferred form, a fully duplexed, branched network, the wavelength range of the plant and sensitivity of the network to reflections are critical aspects which have significant effects on the sizing of the network and the specifications put on each component. Studies by the applicant have shown that the effect of reflections is significant and their effects need to be taken into consideration unless a fully duplicated fibre network is to be used for upstream and downstream. Wavelength range of plant is important to the addition of new service wavelengths. The wavelength flatness of each component, and an overall matching of components to optimise power budget need to be considered in the design of a network according to the present invention.

b) Components

Critical elements here are wavelength flattened coupler arrays, optical blocking filters, connectors for use in customers' equipment and splicing techniques suitable for use on a wide scale in all environments. The first two items on this list have already been discussed in section I above. An interference (or other) optical filter may alternatively be incorporated within the connector at the customer's premises. The alternative strategy of eliminating the customer's connector and relying on a 'hard wired' approach is another possibility. Other methods of incorporating the optical filter in the system can be considered including, for example, fibre based devices which would need to be spliced, either in the customer equipment or the lead-in optical cabling.

III Bit Transport System Design a) The bit transport system (BTS) of the network may eventually need to carry and interface to many disparate services, for example

| | |
|---|---|
| Analogue Telephony | - out of channel signalling (64 + 8kbit/s) |
| Analogue Telephony | - in channel signalling (64kbit/s) |
| Basic Rate ISDN | (2 × 64 + 16 kbits/s) |
| Primary Rate ISDN | (2048kbit/s) |

Although the main initial requirement is expected to be the carrying of analogue telephony with out-of-channel signalling (64+8 kbit/s) it is highly desirable to design a BTS with a framing and channel assignment structure structure that can carry all the services mentioned above by changing the service access units only. This is important for example for the future compatibility with new services.

The highest common factor bit rate for the above example services is 8 kbit/s. Because this rate is also the sampling rate for speech services, corresponding to a 125 us basic frame period, each bit within the 125 us frame corresponds to an 8 kbit/s basic channel. A customer service is then provided by assigning an integer number of these 8 kbit/s channels for example analogue speech with out-of-channel signalling would be assigned 9 channels each of 8 kbit/s, arranged to preserve speech integrity, corresponding to 9 bits within the 125 us basic frame, a basic rate ISDN service would be assigned 18 such 8 kbit/s channels i.e. 18 bits within the basic 125 us frame.

In addition to the information channels within the basic frame there will also be one 8 kbit/s housekeeping channel for each customer optical termination. This will carry housekeeping messages. This means that a customer requiring 1 analogue telephony channel with out-of-channel signalling would have a total of 10 basic 8 kbit/s channels assigned to him and correspondingly a basic rate ISDN customer would have assigned a total of 19 basic 8 kbits/s channels.

A further possibility for the basic frame structure is to use a bit interleaved protocol in order to maximise any advantage to be gained by operating the customer laser in a low duty cycle mode, while retaining the same frame structure for both directions of transmission. This means that rather than transmitting the bits (8 kbit/s channels) assigned to a particular customer sequentiality, they would be spread out fairly uniformly throughout the 125 us basic frame period.

b) Auto Ranging System

Periodically within the total structure, spare time (when service data is not being transmitted) must be reserved for the ranging process. The amount of time reserved for ranging determines the geographical distance over which ranging can be carried out. The frequency at which ranging occurs determines the bit rate overhead that will be incurred. To simplify timing and synchronisation issues the ranging period should be integer multiples of the basic frame period (125 us). A 125 us frame period allows adequate time to range over a geographical distance of 10 km while 250 us will allow ranging over 20 km. In order to reduce the bit rate overhead to approximately 1% a 10 ms periodicity for ranging is possible (this corresponds to 80 basic data frames followed by one ranging frame, a bit rate increase of 81/80).

Preferably there are 3 level or phases of ranging:

Phase 1 ranging occurs for optical terminations (OT) when they are first connected to the system. In this case the exchange end has no information regarding the path delay to and from the OT. The exchange end will therefore use the ranging period to measure this path delay and then subsequently inform the newly fitted OT what local delay to set up for correct timing.

Phase 2 ranging occurs for terminals already connected to the network when a new call is initiated or when the optical terminal is turned on after disconnection from the local power supply. In this case the ranging protocol will be checking the delay period previously assigned to an OT and if necessary making small corrections. In order to maximise laser life times, it is envisaged that the OTs will not be transmitting unless they are carrying traffic, therefore ranging will not be occurring for idle terminals.

Phase 3 ranging is automatic and carried out periodically while an OT is carrying traffic. The exchange end will be monitoring the timing from each active terminal and instructing these terminals (using the housekeeping channels) to make minor corrections to the local delays if any of the timings start to drift. The ranging function provides the means of synchronising each customer's data in the upstream direction, compensating for different line lengths and fluctuations in propagation delay through the network. Automatic ranging will be required to periodically make minor adjustments to correct any timing drift. The provision of a standby battery system for the customer network termination is necessary to maintain telephony service during periods of mains failure.

IV Network Interface and Overall System Design

The BTS discussed in the previous section provides a means of transporting bits across the passive optical network. Appropriate interfaces are needed between the BTS and digital exchange, and between the BTS and customers' apparatus to enable services to be carried which meet the overall requirements of the communications network. The overall system encompasses, testing, network interfacing, reliability, network management, powering and so on.

a) Service

The primary service requirement of a network according to the invention is expected to be analogue telephony. Such a service has to be carried cost effectively between an analogue direct exchange line interface at the customer's premises and a DASS2 2.048 Mbit/s interface to the 64 kbit/s switched network. Besides analogue telephony there are also a wide variety of other services which are presently supported in an analogue manner over the copper pair local network. The BTS frame structure and protocols should be flexible enough to transport basic rate ISDN or CATV signalling. It is an important principle that the addition of future new services is not prejudiced by a restrictive 'telephony-only' design. However, the provision of a minimum cost network may conflict with this objective and a fine balance may need to be struck. The methods that can be used to provide additional service include increased use of TDM by increasing the bit-rate and extending the frame structure, the introduction of WDM, and the provision of additional fibres. These methods are described below.

b) Network and Customer Interfaces

A primary requirement for the UK network will be to interface the network to the 64 kbit/s switched network over 2.048 Mbit/s DASS2 connections with statistically multiplexed signalling in time slot 16. Protocol conversion will then be required at the exchange end to change from the channel associated signalling over the BTS to the statistically multiplexed form needed at the digital exchange. Basic rate ISDN will need to be dealt with in a similar way, with I series to DASS2 conversion needed. At some point in the future, however, the 64 kbit/s switched network will be capable of handling I series protocols which will allow I series to DASS2 conversion to be eliminated. The specification for the analogue telephony customer interface is defined in BTNR 315 but only in terms of the interface at the exchange, not at the customer's termination.

A range of customer units is envisaged to cater for the multiple line business user through to the single line residential user. Modularity of the basic elements will be fundamental to any customer unit design to allow for operational flexibility. Loop disconnect and MF4 signalling will be accommodated.

c) Cabling

Many of the problems in this area are common to any network structure. Modifications to existing solutions are likely to prove adequate for the exchange-cabinet and cabinet-DP links. The street multiplex version of the network will not require very demanding cable developments.

d) Powering

The network termination at the customer's premises will rely on AC mains power provided by the customer. This is a departure from the current practice on the copper pair network of power feeding from the local exchange.

e) Housings

An initial aim is to mount components inside existing cabinets in modular formats.

The DP location needs to follow from a consideration of the DP strategy to be adopted (eg drop cable termination at pole top or in footway box). In a similar manner there are options for the customer's termination (in-house, in garage etc) which would need evaluation prior to an equipment development. With the customer's termination physical security is clearly an issue to be addressed, along with issues of power supply, battery back-up etc. Indeed it is likely that the customer will require two housings, one to change from drop cable to internal cable and the other to house electronics, batteries etc.

Consideration of the street multiplex option essentially gives an extra housing to be designed, and moves some of the termination problems to the external network. Thus power feeding and environmental issues need to be addressed for this area.

V Network Management and Testing

Network management provides the means to operate and maintain the network in an efficient and reliable manner. The facilities required to implement a high degree of remote centralized management include the monitoring of equipment status, remote testing and diagnostics, fault reporting and analysis; correlation and recovery procedures, network initialization, configuration and resource management.

The general network maintenance aim will be to detect and repair faults quickly, with minimum cost and disruption to customers. Ideally this should be by means of detecting slight deterioration of service, and not waiting until the fault severely affects service. Centralized network management and diagnostics should provide the expection of fault localization to an adequate level so that fault correction will occur in a single visit by a trained technician.

Some maintenance functions can be incorporated in the DASS2 messages passing over the 2.048 Mbit/s interfaces via the exchange to the resident Operations and Maintenance Centre OMC. Other functions however will probably need to be managed from a network administration centre, which can gather data from the network housekeeping channels of a number of customer equipments.

BRIEF DESCRIPTION OF THE DRAWINGS

Specific embodiments of the present invention will now be described, by way of example only, and by reference to the accompanying drawings in which

FIGS. 12 to 14 show three stages in a possible evolution of a network according to the present invention initially carrying a telephony service only to an extended multiservice network.

FIGS. 15 to 19 show the Frame Structure of the BTS shown in FIG. 7;

DETAILED DESCRIPTION

Figure 1:
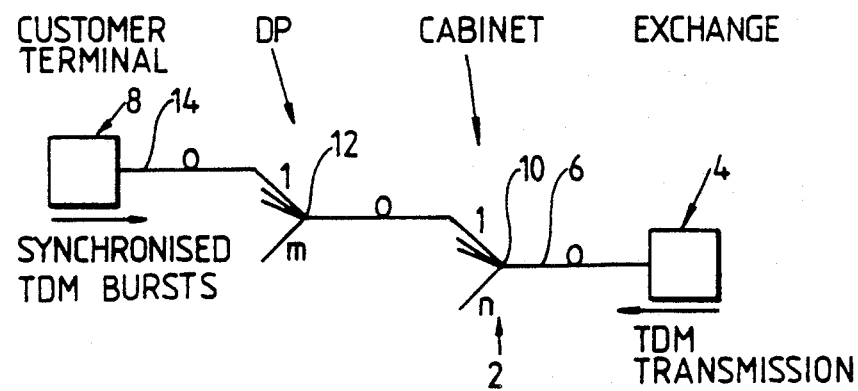
FIG. 1 is a schematic diagram of an optical fibre communication network.

Referring to FIG. 1 shows there is shown the basic concept of a network in which the present invention can be implemented. An optical fibre communications network 2 is shown in which an exchange 4 is linked by single mode optical fibre 6 to 120 customers 8, of which only one is shown for clarity. A two level optical split is employed at cabinet and DP level by means of wavelength flattened optical couplers 10 and 12 respectively.

Each customer 8 receives a fibre 14 from a DP and, via this, a TDM signal broadcast from the exchange 4. The customer's equipment accesses the particular time slots of the TDM intended for that destination plus any associated signalling channels. Further interface circuitry (not shown) provides the detailed services required by the customer, eg analogue telephony or ISDN services. Customers transmit digital speech or data back to the exchange using OTDMA in a low duty-cycle mode with the converging traffic streams passively interleaving at the DP and cabinet branching points. Correct timing is achieved by synchronising the customer's equipment to an exchange clock and using a ranging protocol to set a digital delay line in the customer's equipment to access vacant time slots at the exchange receiver.

Two additional amplitude thresholds are provided at the exchange receiver which allow monitoring and control of the received amplitude. Each customer's time slot is sampled sequentially and his transmitter power is adjusted via a downstream telemetry path so that the received signal falls between the two thresholds. One of the advantages of this approach is that it is not necessary to provide a monitor photodiode at each remote transmitter.

The cost of the customer's transmitter may be further reduced because it operates in a low-duty cycle mode. By operating in this mode there is no need for temperature control of the source. The duty cycle depends upon how many time slots are being accessed and for a single line customer they may be as low as 1:128.

Provisional system design views favour an optical split of up to 128 ways and a transmission rate of 20 Mbit/s. This allows an attractive set of service options for both business and residential customers. Sufficient capacity is available to feed up to 120 customers (allowing 8 spare test ports) with a 144 kbit/s ISDN connection. Business customers requiring larger capacities would access multiple time slots as required up to the maximum capacity of the system.

Since downstream traffic is broadcast, the system design requires measures to ensure communications security. Casual access to time slots can be prevented by appropriate design of the customer's terminal 8. Time slots are accessed according to the setting of the digital delay line in the customers' equipment. This function is remotely controlled by the exchange 4. Encryption and time slot hopping are other measures which may be considered necessary.

Figure 2:
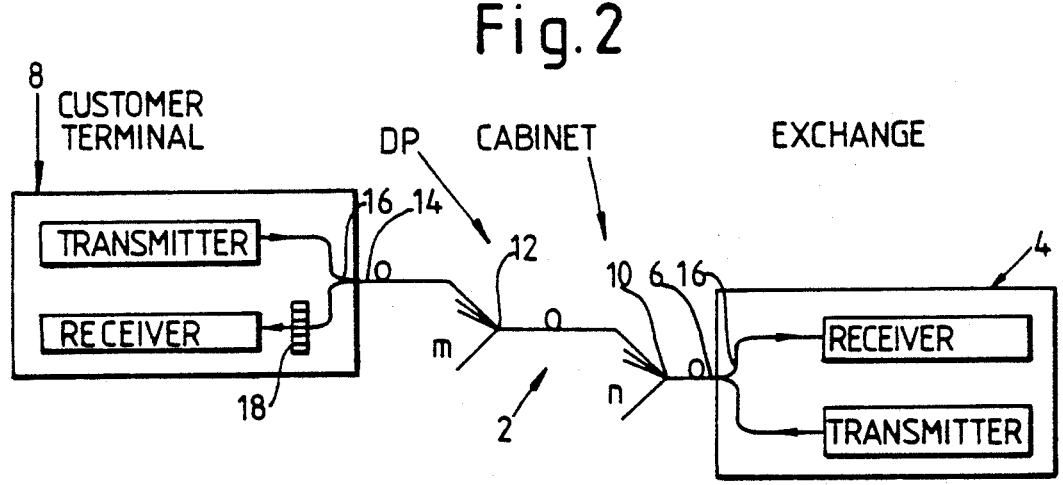
FIG. 2 is a schematic diagram of the network of FIG. 1 arranged for full bidirectional operation.

Referring now to FIG. 2 the optical network 2 of FIG. 1 is arranged for fully bidirectional operation. Problems with reflections and the duplex coupler losses are reduced by operating the network with different upstream and downstream wavelengths. Thus with the downstream (from the exchange 4) traffic carried at 1550 nm and the upstream at 1330 nm, the couplers 16 at each end of the system can be designed to have much lower insertion loss. Additionally the use of blocking optical filters 10 at the customer terminal receivers (to reject the reflected light) eases crosstalk problems considerably, although of course at the expense of providing the filter function.

The fully bidirectional network has the advantage of minimising the amount of fibre installed but suffers more severely from potential crosstalk problems than the other networks, hence the use of separate upstream and downstream wavelengths and the use of filters 18. The network uses a minimum of 2 N couplers (where N is the number of customers, there being 2 couplers per customer). The crosstalk arises from light reflected back from any unterminated fibre end within the network (when ends are prepared to splice-in new customers for example). An additional drawback of this full duplex topology is that the splitters required at each end of the system give rise to an increase of around 6–7 dB in optical path loss over other topologies.

Figure 3:
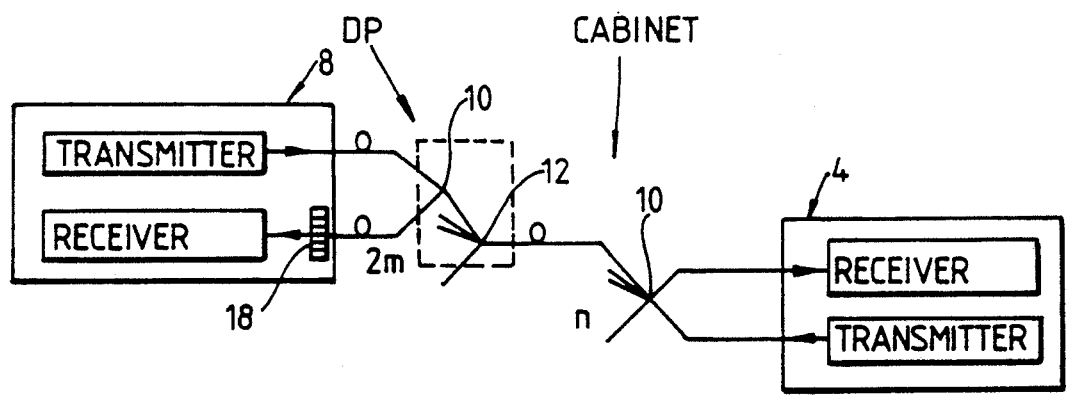
FIG. 3 is a schematic diagram of a network arranged for partial bidirectional operation.

An alternative network is shown in FIG. 3 in which the couplers 16 of FIG. 2 are incorporated into the cabinet and DP splitters, the latter for customer 8 being designated as splitter 20. This uses a minimum of 2 N−1 couplers, one less than the full duplex network but requires more fibre. It also has an additional 3-3.5 dB optical power budget available that could be used to increase the optical split size (and hence reduce the amount of fibre per customer) or relax system engineering margins. Again further discrimination from reflections can be obtained by employing different upstream and downstream wavelengths and optical filtering.

Figure 4:
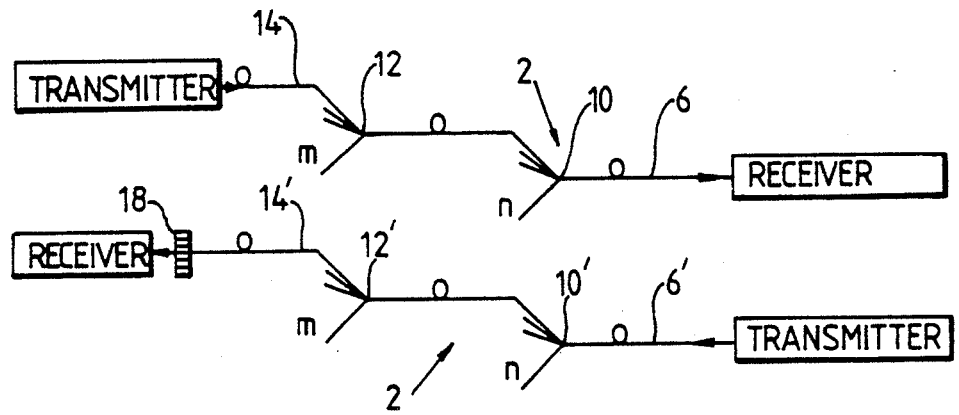
FIG. 4 is a schematic diagram of a network having separate downstream and upstream optical paths between a customer and an exchange.

Referring now to FIG. 4 an optical fibre communications network is shown which has physically separate upstream and downstream optical paths 2 and 2' with respective equivalent components of FIG. 2 marked with the same numbers and the same numbers primed, respectively.

The network shown in FIG. 4 has physically separate upstream and downstream optical paths and therefore reflection problems are completely avoided. It uses 2 N−2 couplers, two less than the number required for the full duplex system but uses twice as much fibre. However the amount of fibre per customer is small in these shared access networks so that the fibre cost overhead is not critical to the economic viability of the system. In addition an extra 6-7 dB of power budget is available which could in principle be used to quadruple the split size and potentially further reduce the amount of fibre per customer. Because the upstream and downstream paths are physically separate there is no advantage in using different wavelengths for the two directions of transmission.

It is expected that the full duplex shown in FIG. 2 will prove to be the most cost effective approach. However some consideration should be given to the network of FIG. 4 where it is possible that the practical engineering advantages associated with the more relaxed optical power budget and lack of reflection problems may outweight the extra fibre cost involved.

Figure 5:
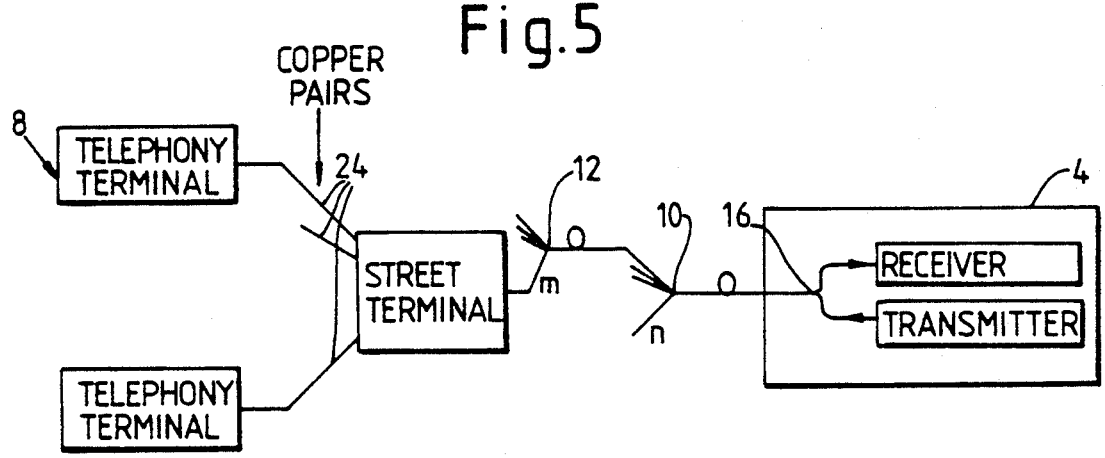
FIG. 5 is a schematic diagram of a network in which there are customer terminals connected to a DP by copper pairs.

The network of FIG. 5 illustrates an option based on the network of FIG. 2 for early penetration to the residential telephony market. It includes an active electronic distribution point at the DP that would exploit the existing copper drop wire 24 connected to an otherwise totally passive optical architecture. This topology could be useful in the short to medium term where full network according to the present invention is provided to a high street business community and whilst in order to reduce duct congestion by removing copper cables, residential customers on the same route are to be connected to the system. As the optical technology continues to reduce in cost the active DPs would be removed and the full network extended to the residential customers to pave the way for the penetration of new broadband services.

Figure 6:
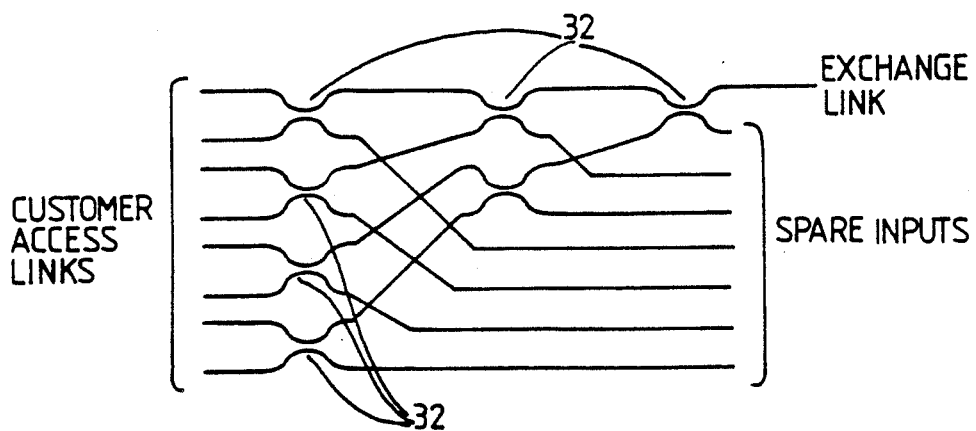
FIG. 6 is a schematic diagram of a fused optical coupler array for use with the networks of FIGS. 1 to 5.

An example of a fused fibre coupler as used in the optical networks of FIGS. 1 to 5 is shown in FIG. 6.

The fused fibre coupler splitter 30 is fabricated from a multi-stage array of 'elemental' 2×2 couplers 32. In order to preserve the potential of both optical windows in the fibre (1300 nm and 1550 nm), wavelength flattened devices are used.

Individual 2×2 wavelength flattened couplers are just becoming commercially available. The technique for fabrication of 2×2 elemental couplers is described in the applicant's co-pending UK patent application no. 8519183. Improvements in coupling ratio tolerances and flatter spectral characteristics in particular are desirable as these have a direct bearing on the optical power budget, optical split size and overall system economics. Initial results indicate coupling ratio variation of around 1 dB across the complete optical window (1275 nm-1575 nm), implying a need for careful choice of coupler parameters and system wavelengths if, for example, the 128-way split target mentioned above is to be realised economically.

The optimum size of the total split is affected by various factors and any convenient figure may be chosen. Factors affecting split size are: cost, optical power budget, system bit rate, service requirements, number of lines per customer etc. An initial study, based on a simple optical power budget model for the bidirectional network of FIG. 2 and the assumption of a maximum system bit rate of around 20 Mbit/s has suggested a binary split size of 128. This would correspond to 120 customers plus 8 test access points with the capacity available to feed 144 bit/s ISDN (or bit rate equivalent) to each individual customer.

Figure 7:
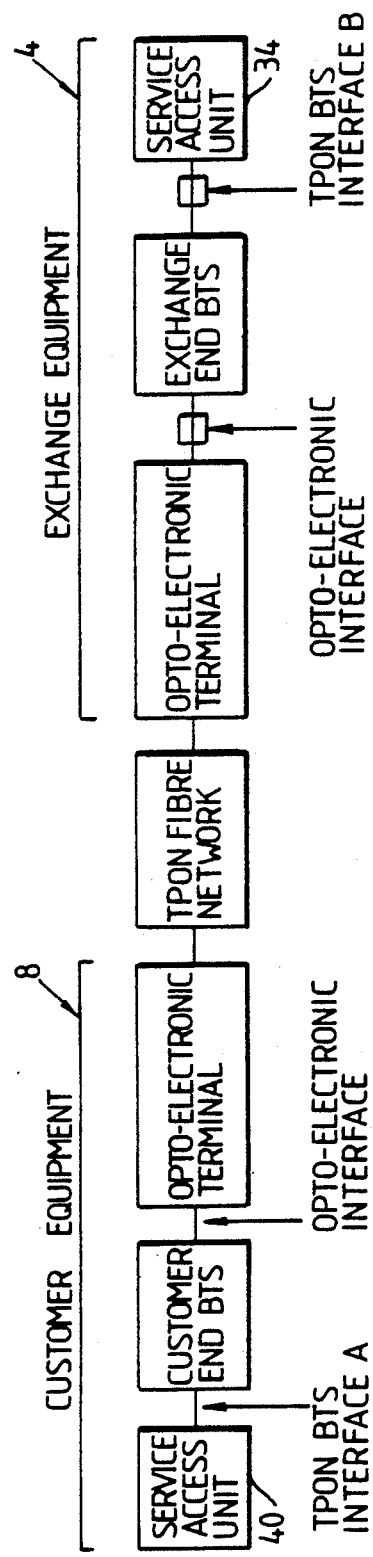
FIG. 7 is a schematic block diagram of a BTS for use with the networks of FIGS. 1 to 5.

Referring now to FIG. 7, there is shown an outline of a bit transport system (BTS) for use with the network shown in FIG. 1. A service access unit 34 at the exchange 4 will take a network service, for example analogue telephony, primary rate ISDN (2 Mbit/s), 64 kbit/s data circuit and so on, and convert it to a standard interface for the BTS. The BTS will then transport this service to a further standard interface in the terminal equipment for customer 8. At this point a customer based service access unit 40 will convert the interface into the required format for the customer equipment eg analogue telephony etc.

Besides the services and any associated signalling etc. the BTS also carries the network housekeeping messages. These housekeeping messages are for the smooth operation of the system, not the services being carried, and include the following system functions:

a. A ranging protocol to keep each channel correctly timed at the exchange end of the system.
b. The ability remotely to turn off customer equipment lasers for fault diagnostic purposes.
c. Remote setting of the drive current to the customer lasers to control the optical output power.
d. The provision of terminal/customer identification, validation and channel assignment.
e. The provision of fault diagnostic data and system interrogation messages.

The ranging function provides the means of synchronising each customer's data in the upstream direction, compensating for different line lengths and fluctuations in propagation delay through the network. The BTS performs ranging periodically and makes minor adjustments thereby to correct any time drift automatically.

FIGS. 15 to 19 show in more detail a BTS capable of carrying an ISDN service to 128 customers.

The basic frame (BF) (FIG. 15) is shown comprising 2304 bits of data traffic and 128 single bit housekeeping channels and 12 bits for fibre identification (ID) which in this example are not being used and so are spare.

Each of the 2304 bits of data traffic corresponds to an 8 kbit/s basic channel from a 30 channel TDM highway. A customer service is then provided by assigning an integer number of these 8 kbit/s channels to each customer. For a basic rate ISDN service each customer is assigned 18 such 8 kbit/s channels ie 18 bits within the BF. Thus 2304 bits represents 128 ISDN service channels each of 18 bits.

The BF contains all the data from all these channels which occurs within one sampling period. A BF thus effectively contains a frame's worth (of 2 Mbit/s highway) of data from the 2304 8 kbit/s channels and the 128 housekeeping channels. The BF is identical for both Head End to Customer End (broadcast) and Customer End to Head End (return) transmissions.

FIG. 16 shows a multiframe which is made up of a portion 50 comprising 80 BFs and a sync frame (SF) 52 which is equivalent to two BFs. The multiframe has a period of 10 ms and comprises 200408 bits. Transmission through the BTS therefore occurs at a rate of 20.0408 Mbit/s.

The broadcast SF 52 (from the Head End) serves a different function to the return SF (from the Customer End).

FIG. 17 shows the SF 52 from the Head End in more detail. The last 140 bits (52A) of the SF from the Head End are essential to system operation as they are the Multiframe sync Pattern from the Head End to the Customer End, comprising for example 140 zero bits, which is identified by the Customer End thus enabling the Customer End to locate and receive the data intended for it from the Multiframe. The first 4748 bits (52B) ensure that broadcast and return framing structures have the same format. These 4748 bits may also be used for fibre identification purposes and general purpose broadcast system maintenance and can generally be referred to as System "housekeeping" data.

FIG. 18 shows the SF (54) from the Customer End. This SF is used primarily for ranging although it may also be used to identify at any point in the network active Customer ends connected to the fibre. The return SF is divided into segments 54A and 54B for phase 1 ranging and for phase 2 ranging.

Phase 1 ranging uses the first 4288 bits (54A). This provides a little over 200 us of blank time in which one Customer End at a time may be ranged. To do this, a housekeeping controller at the Head End will instruct a newly installed Customer End to transmit a single pulse at the start of the phase 1 period. The controller will then identify how many bits delay there is before this pulse arrives at the Head End. After several attempts it will have determined the correct bit delay factor and will instruct the Customer End to proceed to phase 2 ranging using this correction.

The 660 bits for phase 2 ranging and fibre identification are shown in more detail in FIG. 19.

Each of the 128 Customer Ends has its own 5 bit wide phase 2 ranging sub-slot within the last 640 bits (54C) of the SF. These are used by the Head End controller to adjust the transmit phase of the Customer End so that pulses arrive at the Head End aligned with the Head End clock. This obviates the need for any clock recovery at the Head End. Additionally, the return path transmission can be a simple on/off pulsing of the Customer End transmitter, which reduces the life requirements of the Customer End laser. It also results in improved efficiency of use of the return path, as no clock recovery information need be transmitted.

Once the initial phase 2 ranging has been completed, the Customer End is instructed to go "on line". It will now activate its return path housekeeping channel and also its ID Sync pulse. All Customer Ends active in the network transmit this ID Sync pulse followed by nineteen zero bits (together comprising portion 54D) at the same instant.

It provides a high power marker pulse for return path ID detection. An ID detector at the Head End monitors the transmission of this high power pulse, then monitors the subsequent 5 bit wide sub-slots to see if any transmission is present, for example if sub-slot 3 has a pulse in it, Customer End 3 is active in the fibre at this point.

Ideally once the Head End has instructed the Customer Ends as to their respective bit delay factors, all ID Sync pulses occur at the same instant in the SF received at the Head End. However, if for some reason a Customer End appears to suffer drift (which can be due to the equipment or the transmission medium), the effect on the received marker pulse will be very small and the change in the instant at which the ID Sync pulse detection circuit triggers in response to the superimposed ID Sync pulses will be negligible. Thus the Head End will continue to consider all the other Customer Ends as functioning correctly but will calculate a new value for the bit delay factor and send it to the errant Customer End, whereby its ID Sync pulse is brought into synchronisation with the other ID Sync pulses.

The high power ID pulse in conjunction with sub-slots may also be used to detect whether a particular Head End is transmitting using an optical detector such as an optical coupling device as described in our co-pending patent application No. 8706929 at any point in the network. Such a device may be used by clipping it onto a fibre whose outer coating has been removed. This is useful to engineers working in the field, who need to be sure that if they wish to cut a particular fibre, they correctly identify that fibre.

In other words, by monitoring the return SF with the device an engineer can determine the "equipment numbers: of Customer Ends that are active in the fibre, but it will be necessary for the engineer to monitor the broadcast direction to find out which network the fibre is associated with.

Referring again to FIG. 17 the 140 bits for MF Sync pattern may also be used to detect breaks in the fibre network. Using the principles of Optical Time Domain Reflectometry, it is known that a signal transmitted along a fibre will be reflected at a break. The amplitude and frequency of these reflections may be used to determine the location of any breaks in the fibre. Since the MF Sync pattern after scrambling (as described later) is transmitted at regular intervals, an autocorrector at the Head End (FIG. 21) is used to recognise the pattern. The time between transmission of the pattern and reception of any reflections of it will give information on the location of any breaks in the fibre.

Referring to FIGS. 20 to 25, the Head End and Customer End are shown in more detail. An important requirement of a communications system such as this, is that the Customer End keeps in time with the Head End.

Figure 20:
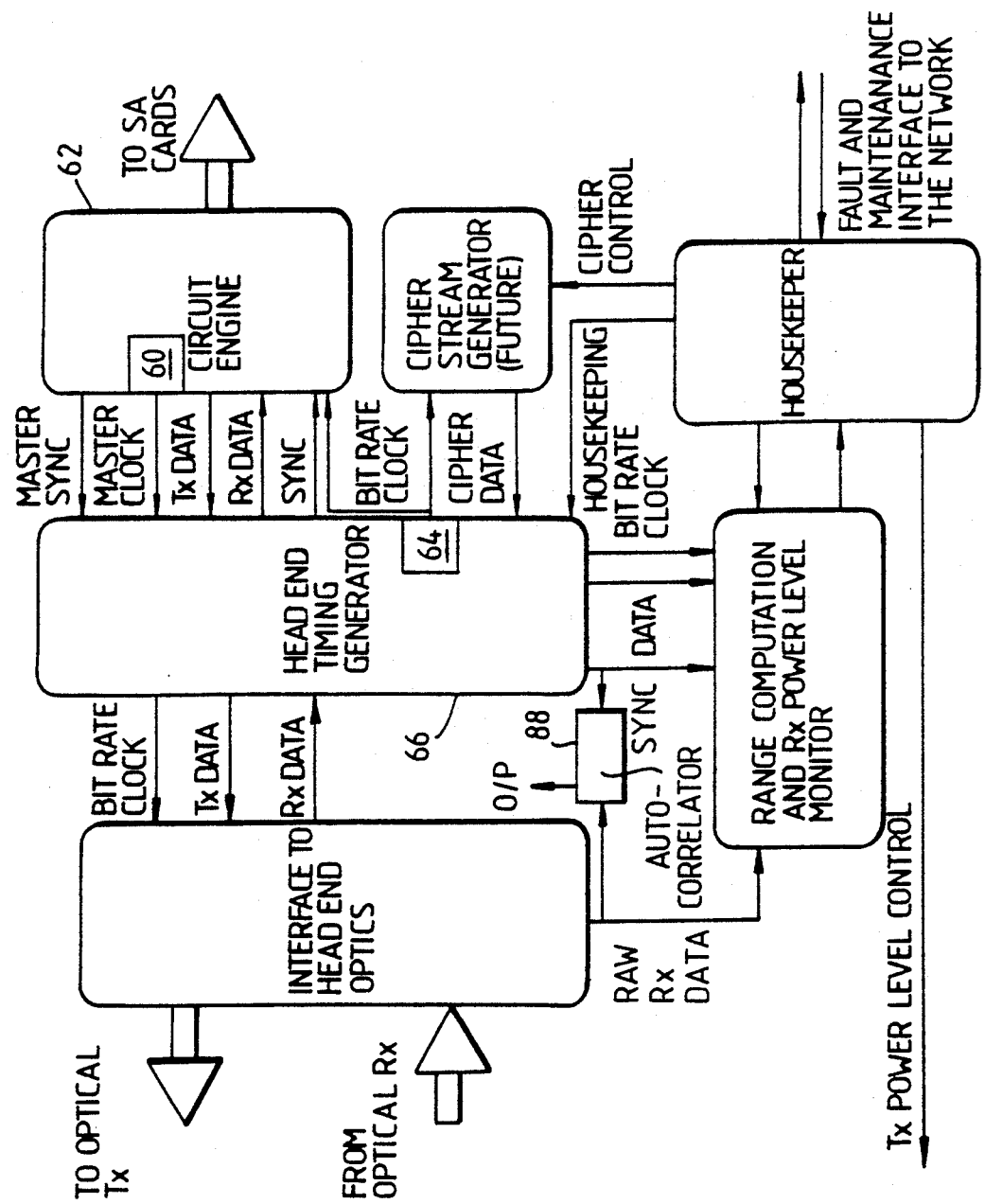
FIGS. 20 to 22 show the Head End of the BTS of FIG. 7.
Figure 21:
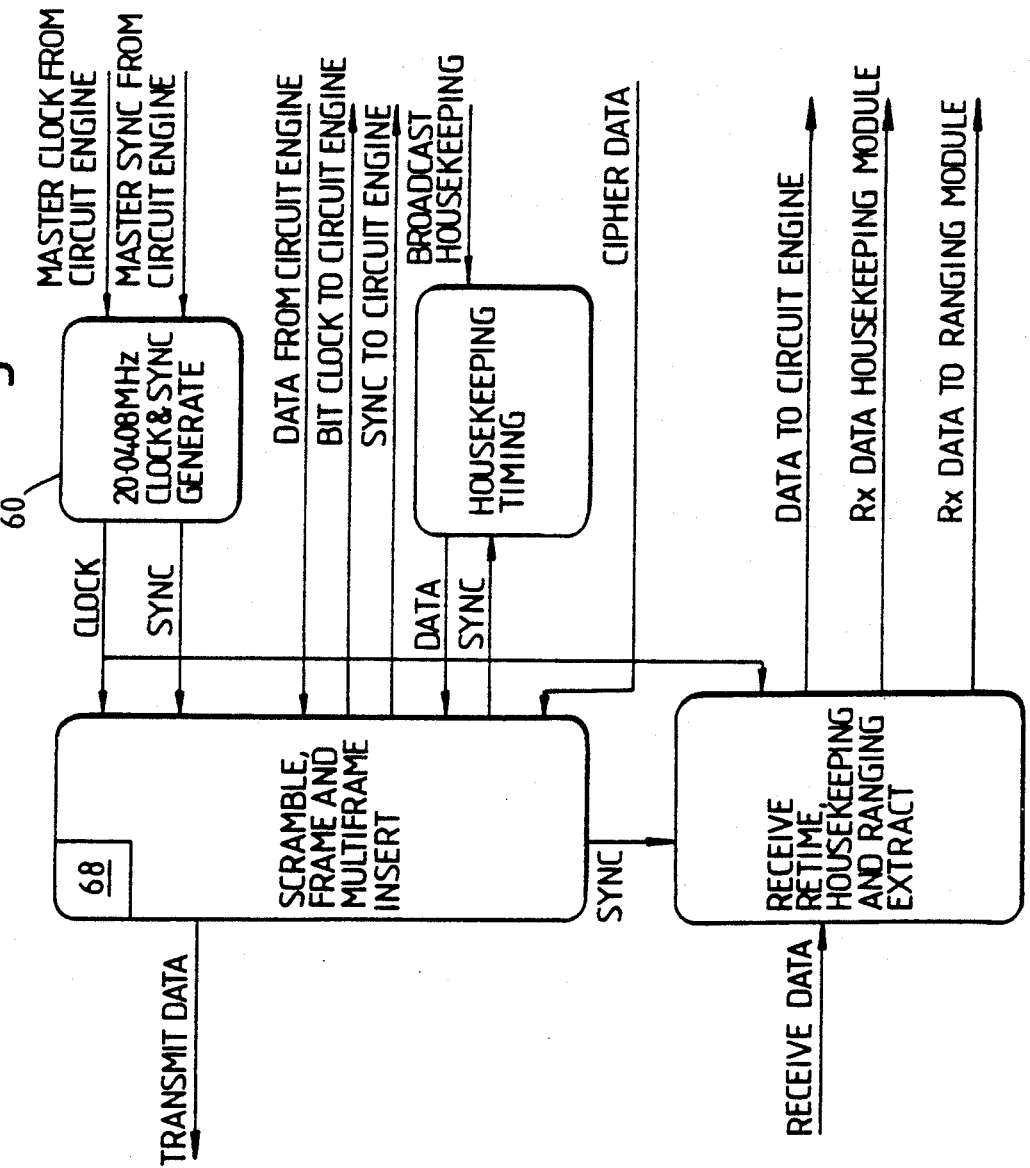
Figure 22:
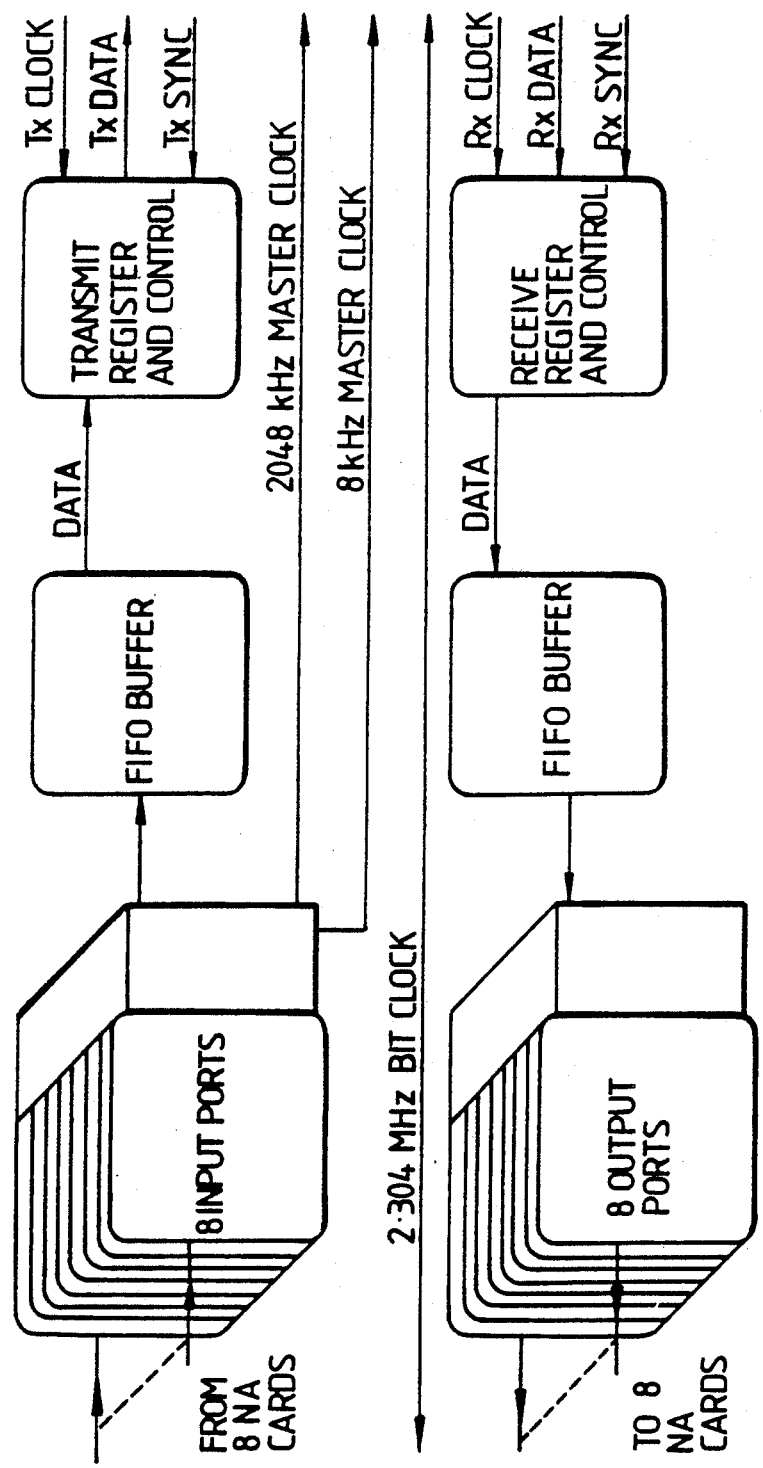

FIGS. 20, 21 and 22 show the Head End. A master clock 60 of 20.0408 MHz which corresponds to the bit rate through the system is phase locked to the incoming 2.048 MHz (abbreviated in this specification to 2 MHz) clock from the Head End circuit engine 62, which corresponds to a standard 32 channel TDM highway. BF (FIG. 22) and MF Sync signals are also generated and locked to the 8 kHz framing signal from the circuit engine. A 2.304 MHz bit clock 64 (in the Head End timing generator 66) is generated in order that the circuit engine can insert an additional bit per channel at the same frame rate into the basic frame in order to convert the bitrate into that required for the system.

In order that the Customer End keeps in 'synchronism' with the Head End, data from the Head End is used to regenerate the clock pulses at the Customer end. The transition between 'zero' bits and 'one' bits are used for this purpose. The data from the Head End may, however, not have sufficient transitions for the clock regeneration. It is therefore necessary to scramble the data from the Head End using a pseudo random binary sequence (PRBS) to produce a data stream which is rich in transitions. Data from the Head End circuit engine is scrambled by scramble 68 as shown in FIG. 21 using a $2^9-1$ scrambling sequence.

The sync frame (FIG. 17) is also scrambled, using a different PRBS (by using different taps of the shift register in scrambler 68), and inserted into the scrambled data. The last 140 bits of the sync frame (FIG. 17), the MF sync pattern, are used to synchronise Customer End. Before scrambling, these 140 bits are 140 zero bits. Once scrambled, they form an easily identifiable pattern which is used for OTDR to detect leaks, as previously mentioned.

Figure 26:
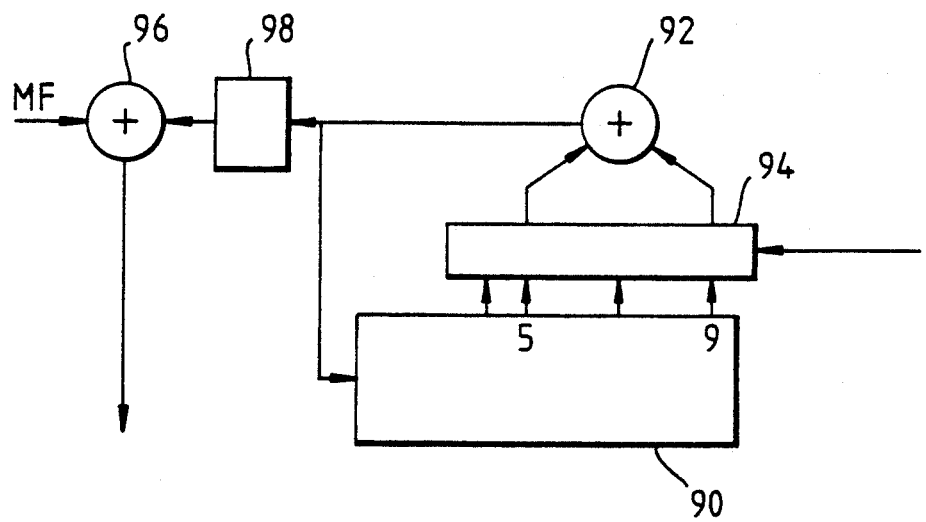
FIG. 26 shows a scrambler used in the Head End.

As shown in FIG. 26, the scrambler 68 is in the form of a conventional PRBS generator having a nine-stage shift register 90 with the outputs from taps at first predetermined positions fed to an X-OR gate 92 whose output is fed back to the input of the shift register thus producing a first predetermined binary sequence. A second predetermined binary sequence is produced by using different taps selected by a gating means 94 controlled by a signal from the frame control to switch at the beginning and end of the SF. The MF is scrambled in conventional manner via X-OR gate 96. By providing similar descrambling circuitry in the outstations, the message data in the 80 BF portion (second portion of the invention) of the MF, and the "housekeeping" or maintenance data in the first part (first portion of the invention) of the SF will be properly descrambled.

It is very important that the Customer end correctly identifies the 140 bits MF sync pattern. If there were a naturally occurring string of 140 zero bits within the first 4748 bits of the sync frame, the Customer End would wrongly identify the MF sync pattern. These 4748 bits are therefore deliberately perturbed after they have been scrambled, in order to introduce a known error. This is achieved by inverting every sixteenth bit by an inverter circuit 98 (FIG. 26) within the scrambler, and ensures that the Customer End will not mis-identify the MF sync pattern. The data may also be ciphered for security reasons.

Any data received at the Head End is returned and presented to the circuit engine:

FIG. 22 shows the Head End circuit engine which has the task of interfacing up to 8 Network Adapter (NA) cards to the BTS. Each NA will handle all the traffic from a 2 Mbit/s data stream (or equivalent). It is assumed that the outputs from all 8 NA cards are frame aligned, and that all 2 MHz clocks are synchronous.

Reference 2.048 MHz and 8 kHz framing clocks are extracted from the NA inputs to phase lock the BTS 20.0408 MHz master clock. The BTS provides a common 2.304 MHz bit clock to each NA to synchronise data transfer to and from the circuit engine.

Data is stored in Fifo buffers, and transmitted through the BTS via the transmit register. Control is provided here to ensure that only the minimum amount of data is stored in the Fifo buffer. This is important to keep a tight control of the transport delay through the BTS.

* On the receive side, data received over the BTS is again stored in a Fifo buffer before being returned to the NA cards via the output ports. Fifo contents control is again provided.

Figure 23:
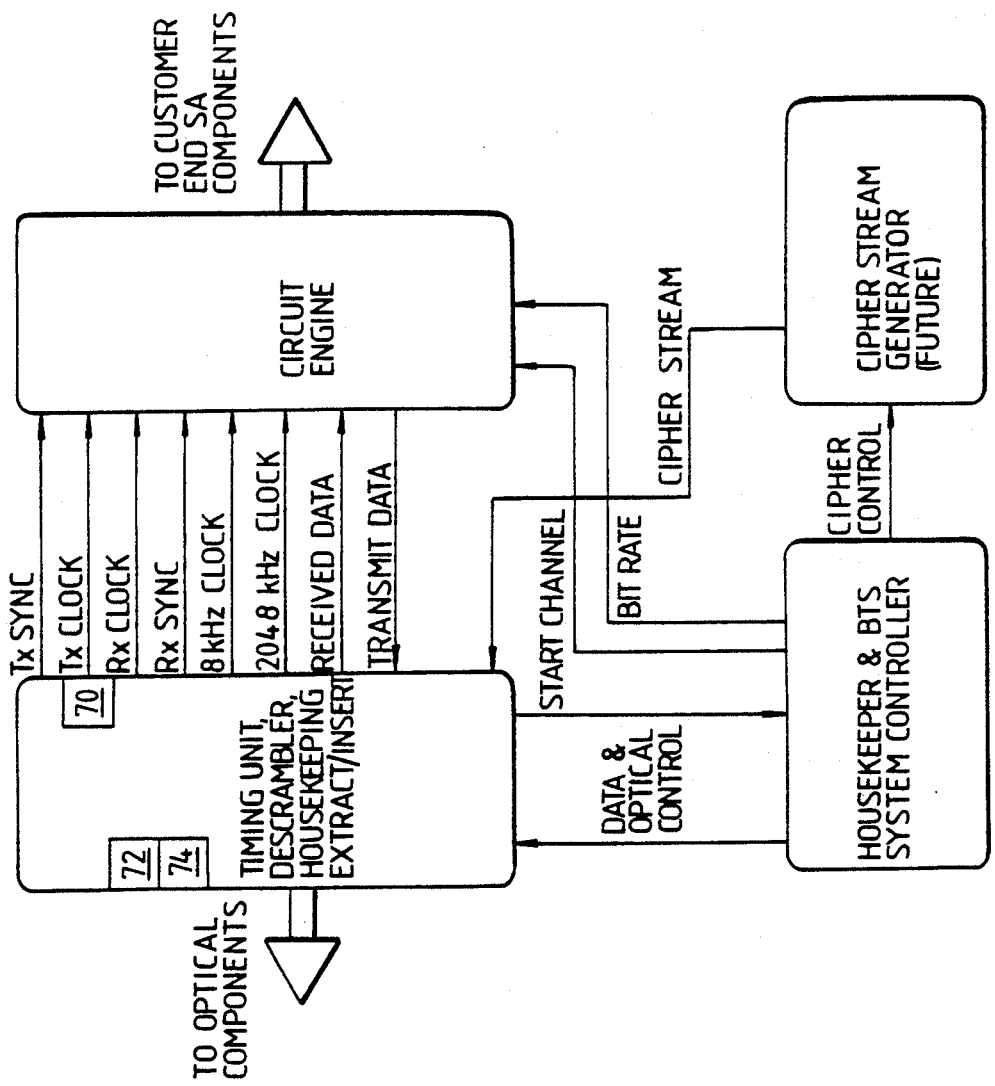
FIGS. 23 to 25 show the Customer End of the BTS of FIG. 7.
Figure 24:
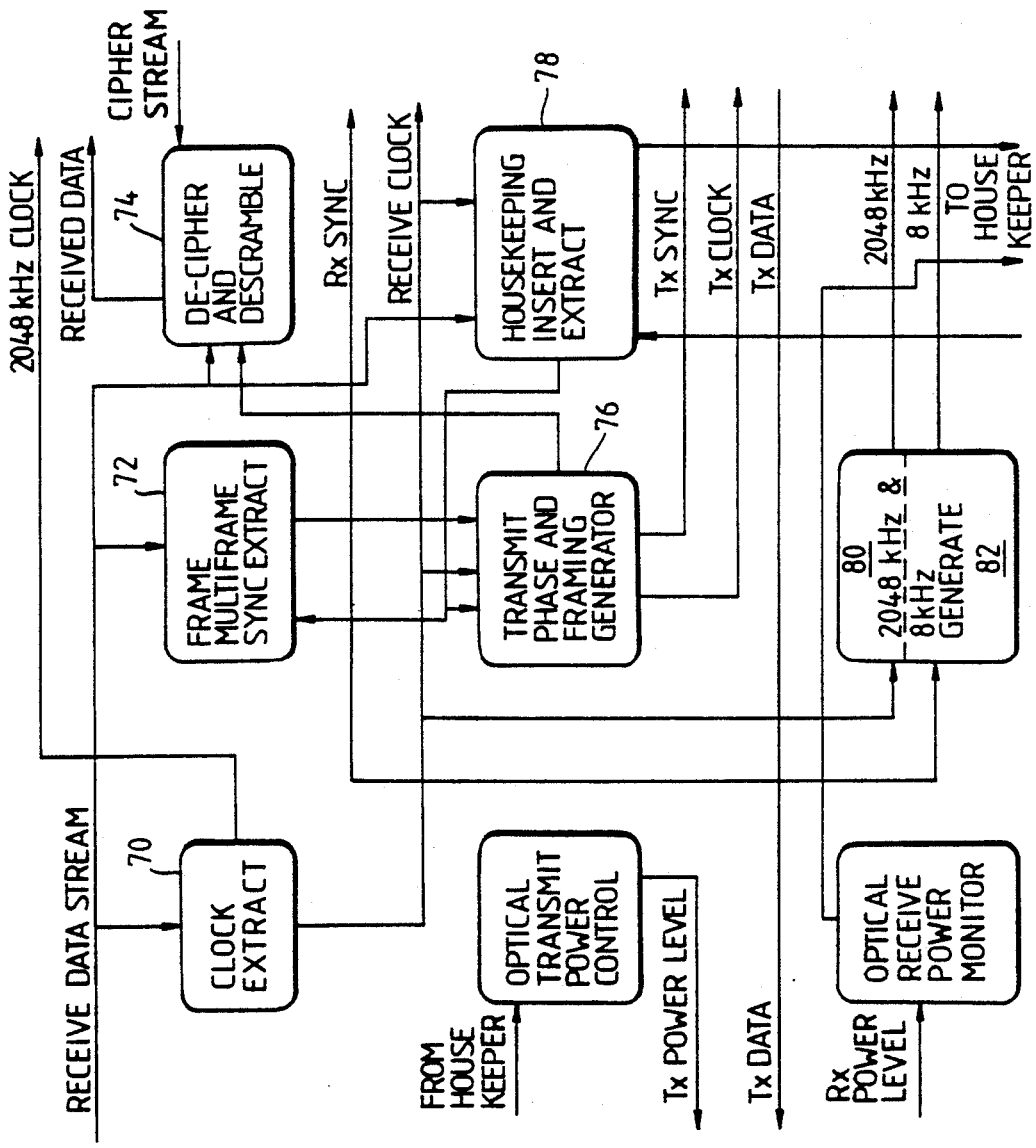
Figure 25:
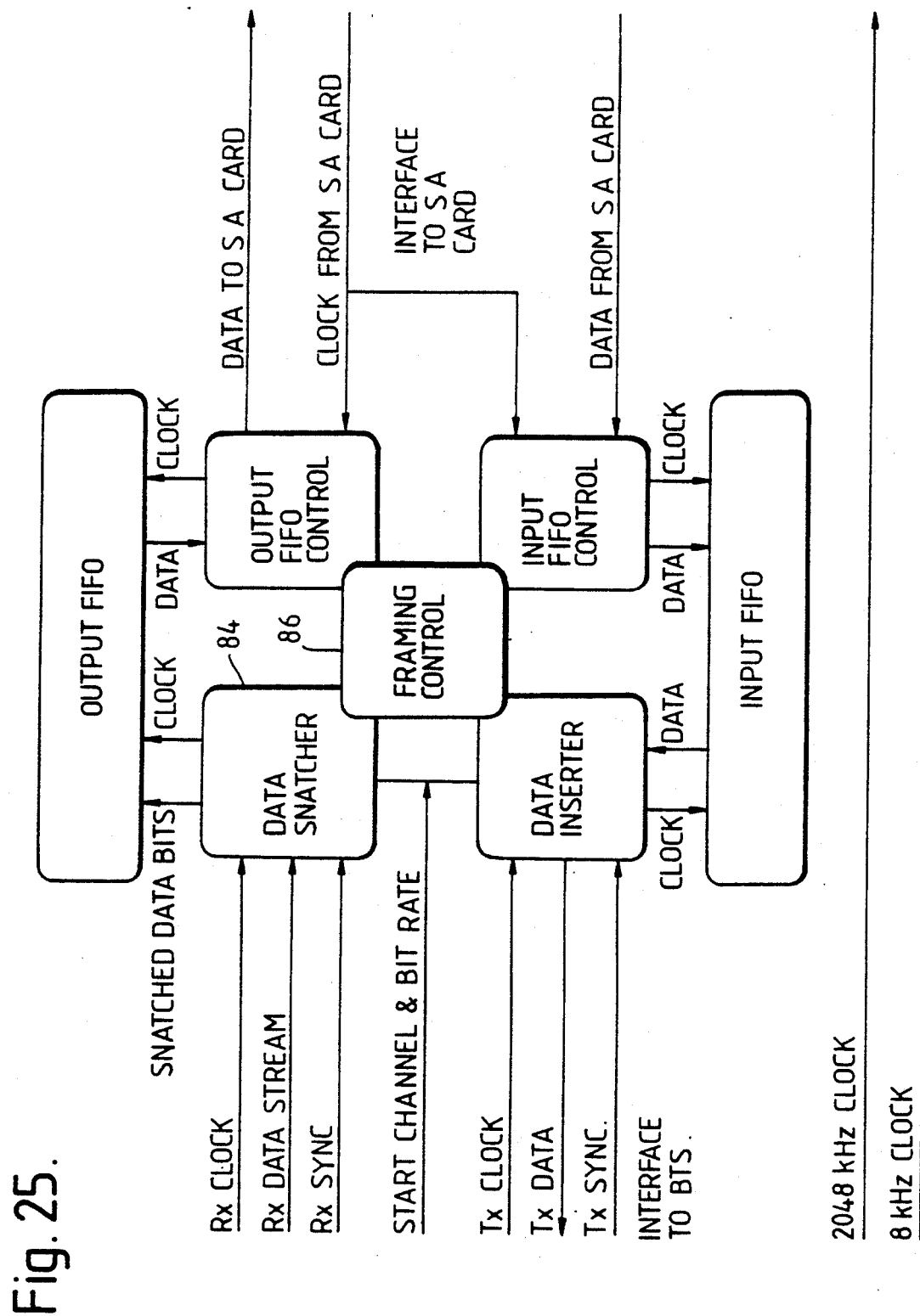

Referring to FIGS. 23, 24 and 25 the Customer End is shown in more detail.

A 20.0408 MHz clock 70 is phase locked to the incoming scrambled data stream. This clocks all the receiver circuitry. The sync frame from the Head End containing the BF and MF sync patterns is descrambled by descrambler 72 (in the form of a self-synchronising descrambler) and extracted to synchronise the receiver.

The broadcast data stream is then descrambled by descrambler 74 which is the inverse of scambler 68, and if it has been ciphered for security reasons, deciphered, and the resultant received data stream is fed to the circuit engine.

The transmit frame timing is offset by a specific number of clock cycles and the transmit clock phase is set in the Transmit Phase and Framing generator 76. The values to be used are provided by the housekeeping extract unit 78. This permits precise adjustment of use, time and phase of arrival of Customer End transmitted data bits at the Head End.

A local 2.048 MHz clock 80 is phase locked to the 20.0408 MHz clock 70, and this and an 8 kHz framing clock 82 are also fed to the circuit engine.

FIG. 25 shows the Customer End circuit engine.

Specific single bits of data are snatched from the received data stream by a Data Snatcher 84, which interprets the start channel band bitrate information from the housekeeping block. The snatched data is stored in an output Fifo buffer until output to the Customer End Network Adapter (CNA).

Control of the Fifo contents is provided by the Framing control block 86 which ensures that the Fifo contents are kept to a minimum. Again this is necessary to minimise the transport delay thought the BTS.

Data is actually clocked in and out of the CNA using a clock derived by the CNA from a standard 2.048 MHz and 8 kHz clock pair provided by the BTS.

Data for transmission to the Head End of the BTS passes through a similar path, and is transmitted as discrete bits interleaved with traffic from other Customer Ends. (Such an approach allows the use of a cheaper laser diode in the Customer End transmitter).

Figure 8:
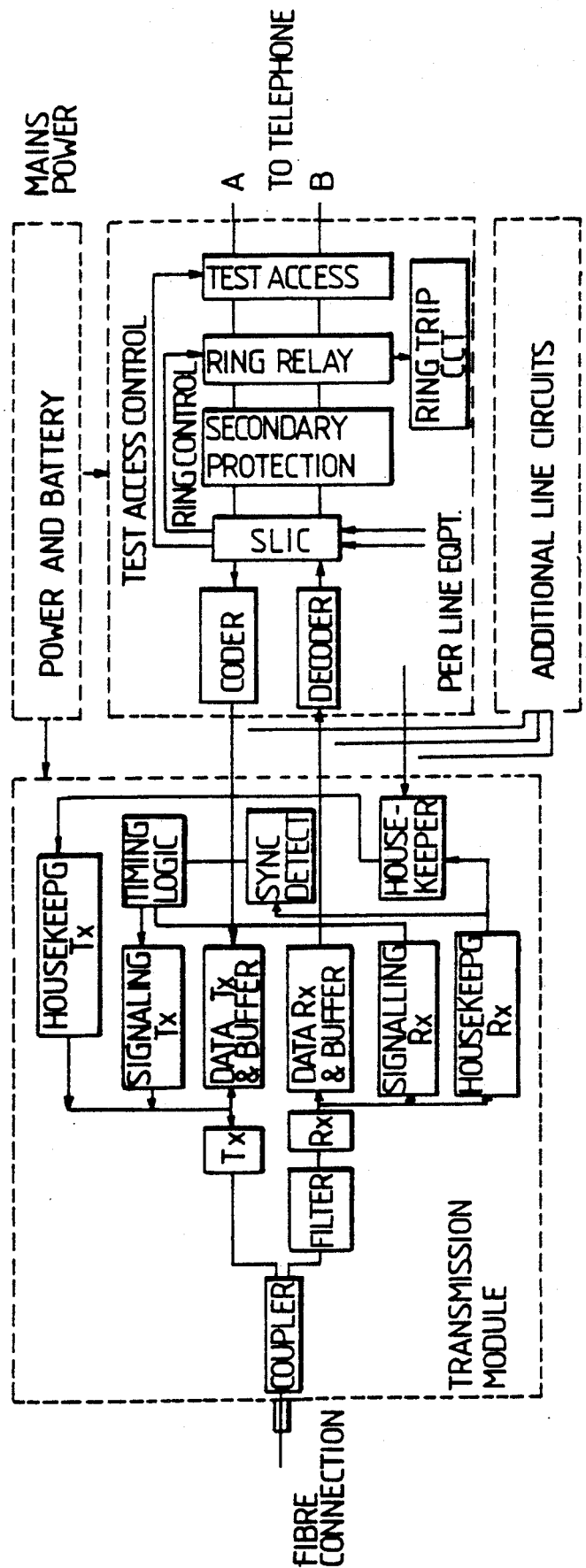
FIG. 8 is a schematic block diagram of a secure transmission module which may be used in customer terminals of the networks of FIGS. 1 to 5.

One simple way to provide security is physically to prevent access to the signals. This may be achieved at the optical level, for example, by not providing a demountable connector, bit merely providing a permanent connection into a sealed unit which would not allow unauthorised access to timeslots from the 'outside world'. FIG. 8 shows a possible transmission module option containing the BTS, optical transmit and optical receive circuitry together with an optical filter and coupler. A 'semi-permanent' optical connection on the line side of the module provides a good degree of security, whilst only authorised time slot data would be available on the electrical connections to the line circuit equipment. This may necessitate configuration data to be downloaded securely from the administration centre to programme remotely timeslot access. Other options include the incorporation of encryption algorithms, and the use of Personal Identification Numbers (PIN's) for user validation.

Figure 9:
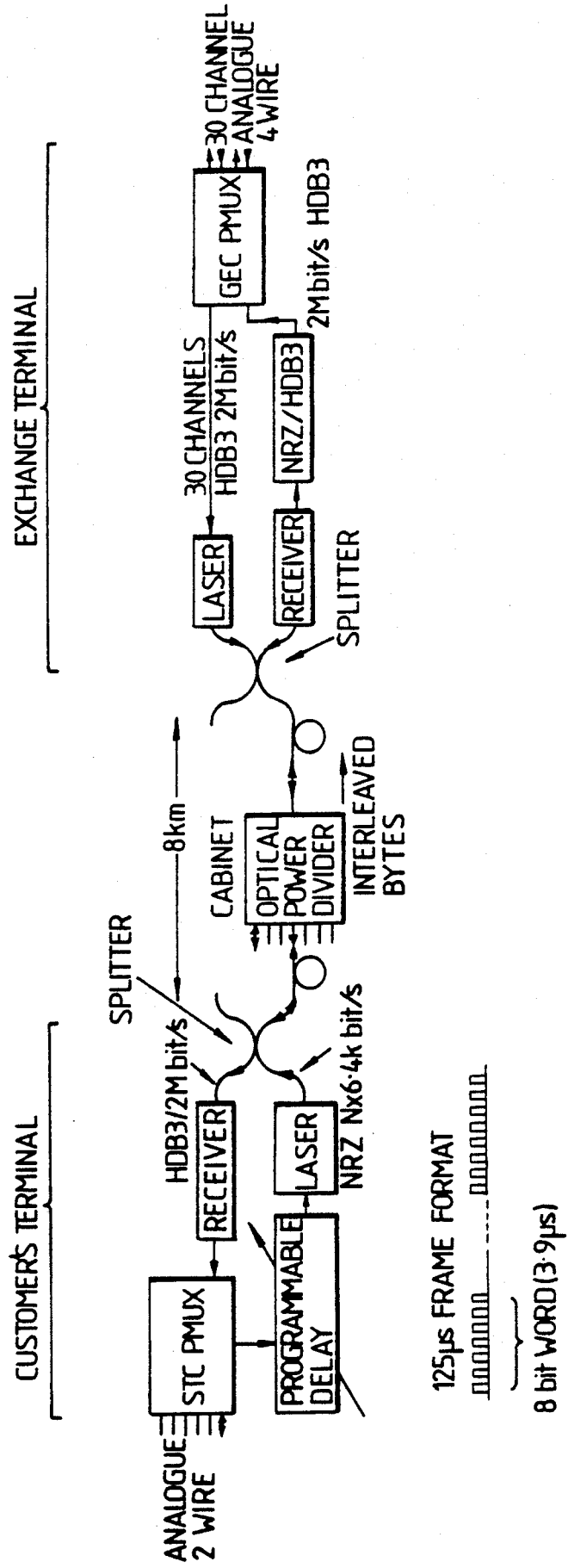
FIG. 9 is a schematic diagram of a multiplex system usable with a network as shown in FIG. 1.

The arrangement of FIG. 9 was used to illustrate the technical feasibility of the present invention. The features demonstrated in this arrangement include:

a) a power divider with sufficient stages to represent the loss of a 256 way split. This splitter is wavelength flattened to permit operation in the 1300 nm and 1550 nm windows;

b) bidirectional operation;
c) a synchronous TDMA optical network. Each remote terminal is locked to a master clock at the exchange and is allocated time slots for return channel signalling. Time slots are interleaved passively in the network;
d) low duty-cycle signalling. Remote lasers are only required to transmit during the allocated time slots. (For the PMUX demonstration system described below the duty cycle is 1/64 per channel. This feature offers enchanced laser reliability and elimination of temperature control circuitry); and
e) automatic ranging. The synchronous network requires the use of a ranging protocol to allocate time slots to remote terminals. This protocol must take account of the round-trip delay and the availability of channels.

The first four of these features use commericially available primary multiplexers (PMUX's) as a basic system building block. PMUX's transmit 30 PCM channels plus frame alignment and signalling bits at 2.048 Mbit/s. The standard circuitry includes the audio A/D and D/A necessary for a telephone interface.

For both demonstrations optical transmitters and receivers for the respective transmission rates of 2 and 8 Mbit/s were used. The first demonstration was of a PMUX system using the configuration shown in FIG. 10. Two types of PMUX were employed: a rack-mounted PMUX representing the local exchange, and several PMUX's representing individual customers. Telephones were connected to the PMUX's via interface boxes which provide DC power and 2 to 4 wire conversion.

In the downstream direction, 30 PCM channels of analogue telephony from the local exchange were multiplexed onto a 2 Mbit/s digital output in HDB3 format (High Density Bipolar ternary code). This was used to modulate directly an IRW semiconductor laser (with mean power feedback control circuitry). The signal then passed through a fused taper coupler to separate the transmit and receive paths at the exchange end. All spare legs on all couplers were index matched to reduce the risk of reflections.

The signal then passed through 6 km of a single mode fibre to simulate the link to the cabinet. It was then distributed to the individual customers via a splitter, fabricated from wavelength flattened fused biconical tapers, which had a loss representing a 256-way splitting ratio. Four of the outputs from this splitter were connected to a further coupler to separate the receive and transmit paths at the customer's end.

Commercial PIN FET transimpedance receivers with a quoted minimum sensitivity of −52 dBm were mounted on a card designed to plug directly into the customer's PMUX. Each PMUX could receive all 30 channels, but only one channel was physically connected for each customer. After subsequent equalisation, this channel was demultiplexed and connected to the customer's telephone.

In the upstream direction, a different transmission format was employed, because of the need to interleave the individual customer's bytes (word interleaving) to form a 2 Mbit/s frame which could be received by the exchange PMUX. The conventional 2 Mbit/s digital output from the customer's PMUX could not therefore be used, so NRZ binary signals were picked directly off the backplane. A transmitter card was designed to do this which plugged directly into the PMUX. This included a laser as before, but operating in low duty-cycle mode without cooling, and an addressable digital delay line to move the customer's channel by 0.5 bit intervals, enabling it to fit correctly into the 2 Mbit/s PCM frame when interleaved with other customer's channels. A total of 5 cards are required to equip a PMUX for up to 8 customers: power card, audio card, mux/control card, transmit card and receive card.

The output from the customer's laser in serial byte format was then passed through the customer's coupler again, back up through the splitter, through the fibre, and into the exchange receiver via the exchange coupler. The NRZ binary was then converted into HDB3 format, using a System X digital line interface card, for input to the PMUX. This signal was converted to telephony via the audio interface as before. Autoranging was not implemented in this demonstration.

The second demonstration is of a multipoint radio demonstration. This demonstration is based on an adaption of the applicant's point to multipoint radio system (PMR) operating over a passive single mode fibre network installed by the blown fibre technique. The network incorporates optical splitters at flexibility points for duplexing and distribution.

For these experiments the radio transmission shelf in the central station equipment of their radio system was replaced by a laser transmitter and optical receiver. Similarly, the subscribers equipment was modified by the addition of an opto-electronic interface.

Figure 10:
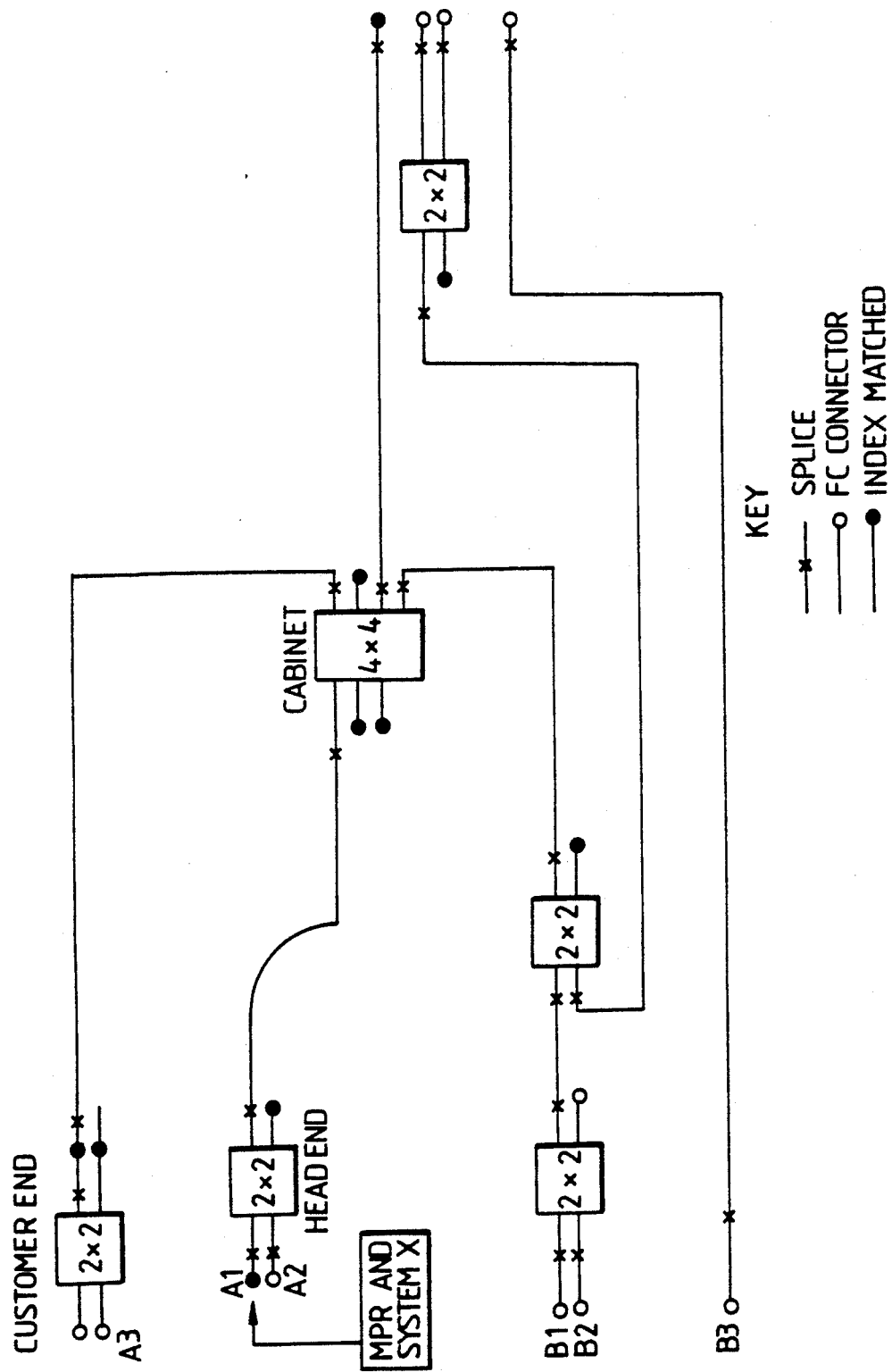
FIG. 10 is a schematic diagram of an experimental arrangement simulating a full installed network.

FIG. 10 shows the experimental network. A two line System X exchange was employed. One line was a 'copper subscriber' using a phone known as an NI1 (Network termination type 1). The other line connected the 'network customer' via the fibre network, through to the exchange. Digital speech was transmitted in both directions simultaneously by calling between the copper and network subscribers.

Initially, a previously installed tube system was extended to provide a link across the demonstration site via a standard PCP cabinet. Wavelength flattened 2×2 splitters were mounted in terminal boxes at each end of the network to provide full duplex transmission capability. A 4×4 flattened array was mounted in the cabinet to model a street flexibility point. An additional 2×2 splitter was mounted to simulate a distribution point (DP).

The blown fibre plant is all standard equipment. BICC splice trays were used to house couplers and splices at the terminal boxes. Index matching was performed on all unterminated fibre ends in the network to reduce crosstalk from back reflections.

All optical plant was installed over a period of two-three weeks. The link length was 1.5 km.

The PMR utilises a TDM broadcast system for downstream communication from Head End to subscriber. The data stream is continous with any unused frames packed with PRBS. Conventional AC coupled laser transmitter and optical receivers were used. The laser launched −8.5 dBm into the fibre at 1300 nm. A 2 Mbit/s optical modem was modified to provide the receiver stage. Receiver sensitivity was measured at −30 dbm.

In the upstream direction transmission is by TDMA with each outstation sending packets of data in assigned time slots. In this case DC coupled optical transmitters and receivers were used. Each customer transmitter was turned fully off when no data was being sent to avoid inter-channel interference on the shared fibre.

This was achieved by biasing the laser off, turning it fully on for a logic 'one' and turning it fully off again for a logic 'zero'. This differs from conventional point to point fibre systems in which the transmitter is biased above turn-on and modulated about that point.

The optical receiver is also designed to operate in the presence of a burst mode signal. A DC coupled receiver is required to avoid baseline drift in the absence of received data during the quiet period between packets. The receiver used was based on a long wavelength InGaAs PIN photodiode operating into a high input impedance FET op-amp, with bootstrap feedback to reduce input capacitance.

A ranging function is required at the subscriber's terminal to ensure that packets are transmitted at the correct instant to avoid time overlap at the Head End.

The preferred arrangement for a full network is to have 15 exchange lines at the DP, with 1 to 15 exchange lines interfaces per customer optical termination, a two level optical split hierarchy (nominally at cabinet and DP sites) with a distance of 1.6 km between exchange and cabinet, 500 m between cabinet and DP and each customer.

If a copper wire is made to some customers from the network a single level optical split hierarchy is preferred, nominally sited at the cabinet.

Although a conventional exchange to cabinet distance of 1.6 km has been assumed, the system will be capable of much greater ranges of at least 10 km. This can provide a basis for rationalising the number of local exchanges in a given network. The efficient multiplexing structure of such a network (arising from the combination of optical splitting and the sharing of the customer's optical connection cost over multiple lines) should mean that the enhanced upper network costs associated with the longer links are kept within bounds. This should allow any significant cost savings identified for exchange rationalisation to be enjoyed to the full.

The passive network architecture offered by the present invention presents an opportunity for evolution towards a broadband multiservice network. When considering the evolution to broadband service capability two important principles need to be adhered to as far as possible. They are: (a) the need to minimise the cost of any additional features that are required on the initial network in order to allow graceful evolution to a multiservice broadband network and (b) to be able to add broadband services to an existing system without disturbing the basic telephony customers already connected.

An important consideration for the broadband network is the amount of extra field plant and installation work that will be required to add the new services. The aim here must be to minimise such costs by utilising as much as possible of the installed system base.

Expansion of the system to carry higher bitrate services such as cable television requires the use of wavelength division multiplexing (WDM) techniques unless the bitrate is sufficiently large at the outset to allow for future broadband service. The latter would load the costs of the initial basic services to an unacceptable degree and the introduction of broadband service must, at minimum, depend on the addition of at least one wavelength, allowing the existing narrowband customers to continue undisturbed in low bitrate mode. Because broadband services require higher bit rates than the low speed data and speech services the optical receiver sensitivities will be considerably reduced. This implies that the optical splitting ratio used will be too large for the optical power budget available for the broadband services. It follows therefore that different access points will need to be available for the feeder fibres, carrying the broadband services from the Head End, into the optical splitter array.

A bi-directional optical branching network with two stages of splitting can have a service upgrade by providing additional fibre from the exchange to the first splitting point and connecting in at different levels within this splitter. Although the bi-directional network has received the greatest attention so far, other structures are possible within the passive optical network concept of the applicant's invention and some of these may have advantages either in an initial telephony realisation or in the evolution of broadband services. For example, the telephony could be two unidirectional networks respectively carrying "go" and "return" channels to gain the benefits of lower transmission losses and avoiding reflection problems or it could have a single stage of splitting as described above in relation to FIG. 4.

Figure 11:
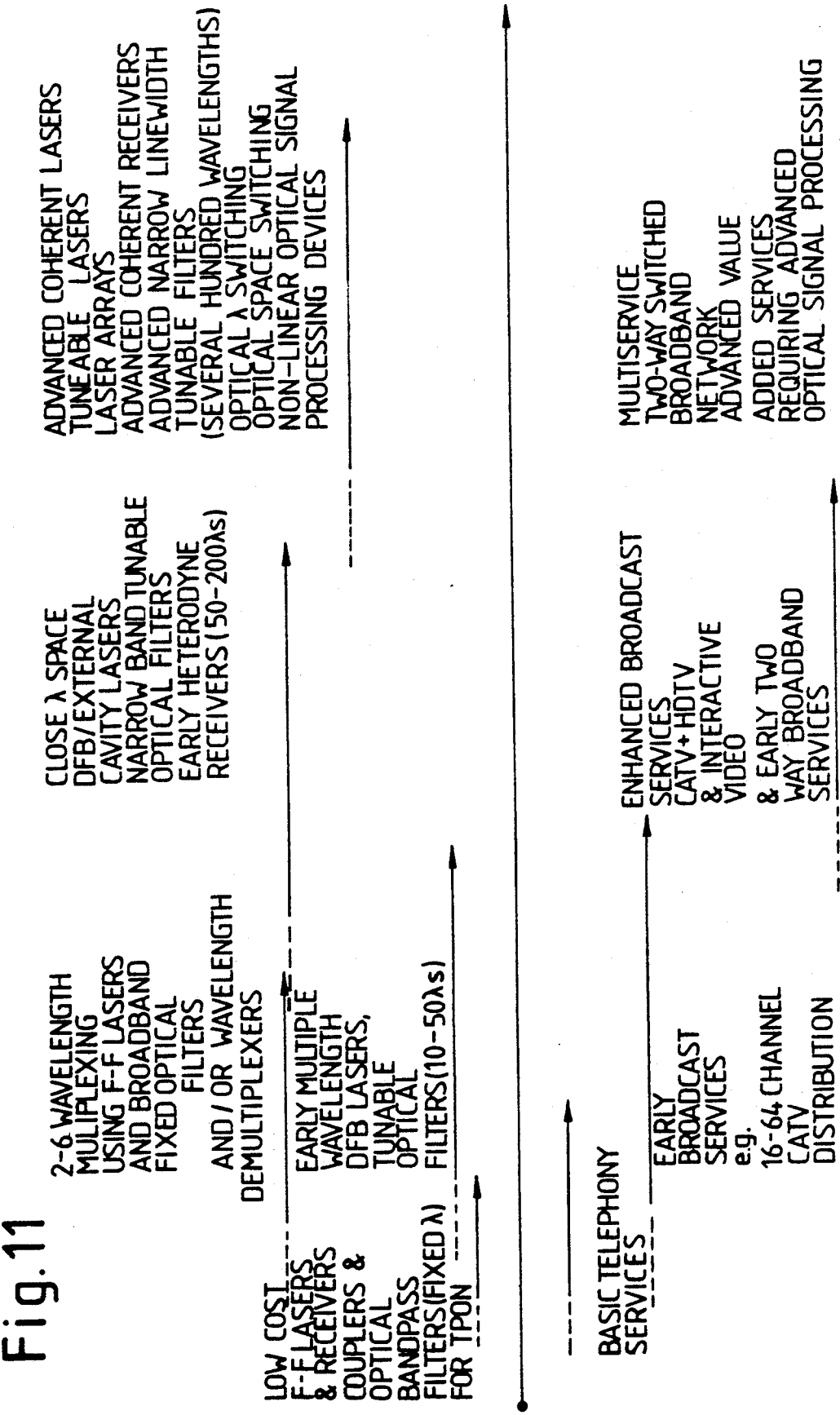
FIG. 11 is a table showing the possible enhancements of a basic telephony network according to the present invention and the associated technology enhancements expected to be required to provide the enhancements.

The evolution of the optical technology and the service package carried by an enhanced network are obviously closely coupled. For example the number of wavelengths available for broadband upgrade will depend crucially on the optical technology invoked. Also the technologies used for exchange to customer transmission could be economically viable well in advance of customer to exchange transmission because of resource sharing at the exchange end. The technology available for optical wavelength multiplexing can be crudely divided into three categories of sophistication with many permutations in between (a more detailed breakdown of possible optical technology evolution and service packages is illustrated in FIG. 11.

a. Fabry-Perot (F-P) lasers used with fixed wavelength filters for wavelength selection.

b. Single longitudinal mode lasers (e.g. DFB) with tunable optical filters 18 and possibly early heterodyne optical receivers for wavelength selection.

c. Advanced coherent optical sources with combinations of optical filters (tunable) and electrical (heterodyne) techniques for channel selection.

The production tolerances of the fixed wavelength filters and the center wavelengths and line widths of the F-P laser sources would mean that technology category (a) would limit the number of wavelengths available to between 6 and 12 wavelengths over both windows of the fibre. In the customer to exchange direction where temperature control of the laser sources might be prohibitively expensive the number of wavelengths available could be limited to between 2 and 4 over both windows.

With the technology (b) scenario the numbers of potential wavelengths could be considerably greater with maybe as many as one to two hundred being possible in the exchange to customer direction in the longer term. However it may well be that practical considerations such as the size of split or safety issues would limit the size of the wavelength multiplex before the optical technology did so. Even in the upstream direction, without any means of wavelength drift correction, 10–50 channels could be available.

Where the coherent technology of scenario (c) is invoked then many hundreds of wavelengths are possible in principle, the limitations being imposed by non-linear phenomena in the fibres. With the large number of wavelength channels and the potentially large optical power budgets available, this technology would offer a further major reappraisal of the operating topologies for optical networks.

The three technology scenarios are also indicative of relative timescale availability. With scenario (a) effectively being "today's" technology, (b) being possible in the two to five year time scale and (c) maybe being available within the decade at commercially acceptable prices. However any time scale predictions concerning advanced optical technology must be made with extreme caution and may even, given the pace of earlier optical development, prove to be pessimistic.

Given that wavelength multiplexing will be the method for introducing broadband services into the network and that studies into the optimum topology are still required, the following are some examples of how the bidirectional branching network with two stages of splitting might evolve described with reference to FIGS. 12 to 14.

Figure 12:
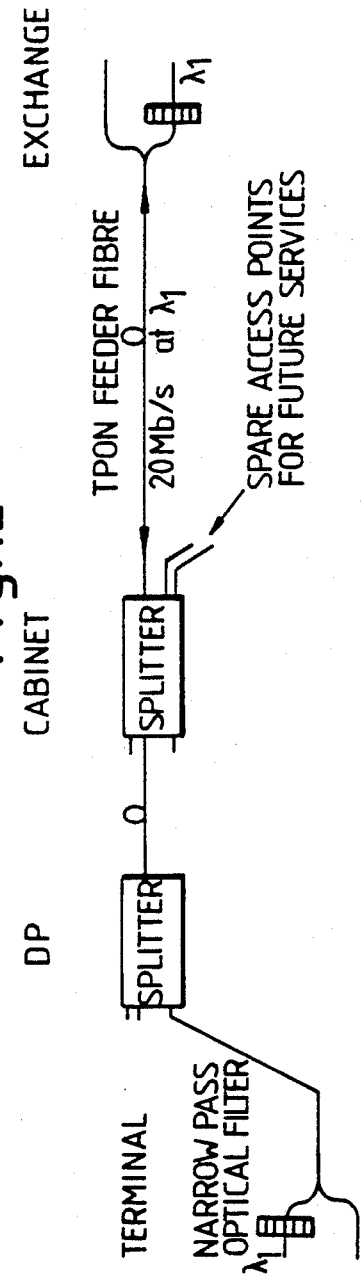

FIG. 12 shows an initial network using a single wavelength to provide telephony/data services. The narrow pass optical filter at the customer's equipment allows the passage of only the initial wavelength for narrow band services, thus blocking interfering channels from (and unauthorised access to) broadband services added at a later stage. Another key provision for wideband service is the installation at the outset of a multi-stage cabinet splitter which operates over a broad optical bandwidth in both 1300 and 1500 windows. This facilitates partial bypass by wideband service feeder fibres between the exchange and cabinet (see below). These extra fibres may be installed either within the cable or separately at a later date.

FIG. 13 shows how additional wavelengths can be used to add new services e.g. cable TV (CATV) to the network without disruption to the telephony service. The extra wavelengths are carried to the cabinet via additional feeder fibres and are fed into the network at space inputs to the cabinet splitter. The additional wavelengths will in general carry a higher bitrate than the telephony and ISDN channels. To accommodate the reduced receiver sensitivity incurred by the higher transmission bitrate, the fibre could bypass part of the cabinet splitter to reduce the optical path loss between the exchange/head end and the customers' equipment. Customers destined to receive the additional broadband services would be equipped with a simple wavelength demultiplexer to separate the broadband and narrowband wavelengths.

Each additional wavelength, multiplexed onto a common fibre between the exchange and cabinet, could carry a CATV digital multiplex at say 565 Mbit/s. This allows 16×70 Mbit/s or 8×140 Mbit/s channels to be broadcast per extra wavelength, over that sector of the network. At this bitrate the optical split could be limited to 32 ways compared with say 128 for the telephony optical split. However the addition of only one or two extra optical wavelengths could provide a CATV service delivering 16 to 32 channels on the basic optical telephony network. This would require very few additional optical components-i.e. broadband optical transmitters and wavelength multiplexer at the exchange; wavelength demultiplexer and broadband receiver(s) at each customer terminal.

Additional wavelengths provided in this way give rise to an important choice for the operation of the CATV services:

the customers could access any of the broadcast wavelengths via a tunable optical filter incorporated into their terminal equipment. This would allow simultaneous reception of several channels chosen from the electrical multiplex of 8 or 16 channels carried on the selected wavelength. Simultaneous reception of more than one optical wavelength would require additional optical filtering and an optical receiver for each additional wavelength selected. However, 100% penetration of a service offering any number of simultaneous channels (up to the total number transmitted on a feeder fibre) to each customer could be achieved in this way.

Alternatively the number of CATV channels made available by the combination of WDM and TDM could be enough to allow one or more dedicated video channels to be assigned to each CATV customer. In this case the network operates as a star with the switch sited centrally at the exchange. This system would use fixed wavelength demultiplexer and one optical receiver in the customer's equipment. Although this might simplify the customer equipment it could mean a compromise between service penetration and number of simultaneous channels received by the customers. For example if the combination of WDM and TDM allowed 32 channels to be transmitted on each feeder fibre and a 32 way optical split could be achieved, then 1 channel per customer could be allocated on a 100% penetration basis. If however 4 channels per customer were required then a penetration of only 25% would be available unless extra wavelengths could be provided to deliver more channels.

A more advanced stage using DFB lasers and illustrated in FIG. 14 will allow the allocation of at least one dedicated wavelength per customer. For example, with say 12 to 32 wavelengths available on a 32 way split it would be possible to allocate each CATV customer with one wavelength to carry all the required broadband services e.g. CATV, HDTV etc. The smaller number of wavelengths would limit penetration to 40% but as the number of wavelengths approached 32, 100% penetration could be achieved.

Rather than simply dedicating the wavelengths to individual customers there is also at this stage the opportunity of using tunable optical filters at the customers' premises as a broadband switching stage. This could significantly simplify the exchange switching of disparate broadband services (e.g. mixtures of broadcast and dedicated services from multiple sources could be multiplexed onto different optical wavelengths and be selected by the customer equipment).

For each of the technology stages described the number of wavelengths that are possible depends critically on the tolerancing and stability of the lasers, filters and the useable bandwidth of the fibre and couplers. Low cost narrowband services such as telephony and ISDN may necessarily operate without temperature stabilisation in customers' terminals which could mean significant wavelength drifting of the customers' lasers. Hence if schemes such as those shown in FIG. 2 to 7 are used, large channel spacings would be necessary for services in the customer to exchange direction of transmission. Closer spacing would be possible in the exchange to customer direction by using temperature controlled sources at the exchange and tunable filters within the customers' equipment to eliminate filter centre wavelength tolerances.

I claim:

1. A central station for a digital communications network, said central station comprising:
   means for transmitting digital data to outstations in the form of a stream of frames, each frame comprising a first portion containing a digital synchronisation signal and digital housekeeping data for the outstations, and a second portion containing digital traffic data for the outstations, and
   scrambling means for scrambling the contents of said first portions by a first predetermined binary sequence of digital signals, and for scrambling the contents of said second portions by a second predetermined binary sequence of digital signals.

2. A cental station as in claim 1 wherein the means for scrambling employs a single binary sequence generator and utilises respective different taps of a shift register of the generator to provide said first and second binary sequences.

3. An outstation for a digital communications network, arranged to receive frames from a central station, each frame comprising a first portion containing a digital synchronisation signal and digital housekeeping data for outstations and a second portion containing digital traffic data, the outstation comprising:
   descrambling means for descrambling the contents of said first portions in accordance with a first predetermined binary sequence of digital signals, and for descrambling the contents of said second portions in accordance with a second predetermined binary sequence of digital signals, and
   means responsive to a synchronization signal in the frames to select said second predetermined binary sequence at the start of said second portions and to select said first predetermined binary sequence at the start of said first portions.

4. An outstation as in claim 3 wherein the descrambling means employs a single binary sequence generator and utilises respective different taps of a shift register of the generator to provide said first and second binary sequences.

* * * * *